United States Patent [19]

Farmont

[11] Patent Number: 5,238,290

[45] Date of Patent: Aug. 24, 1993

[54] SLIDING ROOF FOR MOTOR VEHICLE

[76] Inventor: Rolf Farmont, Hortenstrasse 17, 4000 Düsseldorf, Fed. Rep. of Germany

[21] Appl. No.: 784,464

[22] Filed: Oct. 24, 1991

Related U.S. Application Data

[63] Continuation of Ser. No. 664,869, Mar. 5, 1991, abandoned, which is a continuation of Ser. No. 91,665, Aug. 17, 1987, abandoned.

[30] Foreign Application Priority Data

Dec. 19, 1985 [DE] Fed. Rep. of Germany ....... 3544940
Dec. 19, 1985 [DE] Fed. Rep. of Germany ....... 3544941

[51] Int. Cl.$^5$ ............................................. B60J 7/047
[52] U.S. Cl. .................................... 296/216; 296/220; 296/223; 296/224
[58] Field of Search ................ 296/216, 220, 223, 224

[56] References Cited

U.S. PATENT DOCUMENTS 4,624,501 11/1986 Niwa et al. ........................... 296/222
4,626,027 12/1986 Farmont .......................... 296/216 X

FOREIGN PATENT DOCUMENTS 0134042 3/1985 European Pat. Off. .
3404541 9/1990 Fed. Rep. of Germany .
884344 12/1961 United Kingdom .
2068304 6/1983 United Kingdom ................ 296/216
2164006 3/1986 United Kingdom .

Primary Examiner—Dennis H. Pedder
Attorney, Agent, or Firm—Tarolli, Sundheim & Covell

[57] ABSTRACT

A sliding roof for a motor vehicle is disclosed, which comprises a plate with a front edge and a rear edge, an opening in a vehicle roof, a guide rail, a front support, a rear support a height-level adjustment member, and an actuating member. The plate closes in its frontmost position the opening (1) in the motor vehicle roof (2). The plate is at least height-level adjustable at its rear edge with a rear height-level adjustment member. The plate is slidable outside of the roof opening (1) in various positions on one side of the motor vehicle roof (2). The plate is supported by at least one rearwardly disposed rear support (36), where the rear support is provided with the rear height-level adjustment member. The plate can be adjusted, with respect to its height-level, slidably by way of at least one actuating member. An improvement with regard to a precise guiding, as well as an advantageous course of motion of the plate, is achieved in that the guide rail is disposed tiltable by way of a rear height-level adjustment member around a horizontal cross axis. The plate (13) is guided slidingly with respect to the rear height-level adjustment member in the longitudinal direction A of the vehicle.

25 Claims, 15 Drawing Sheets

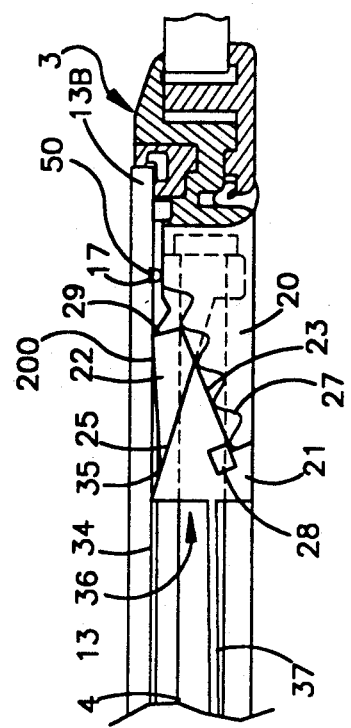
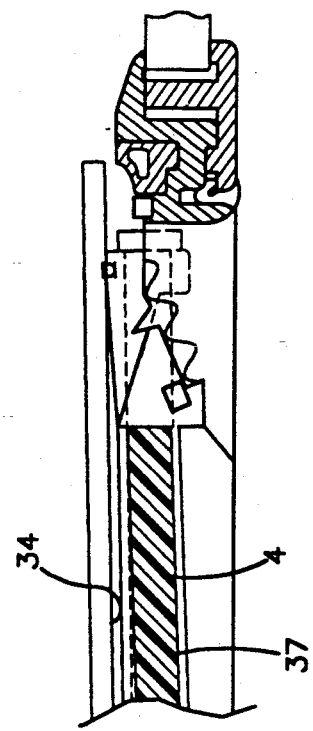
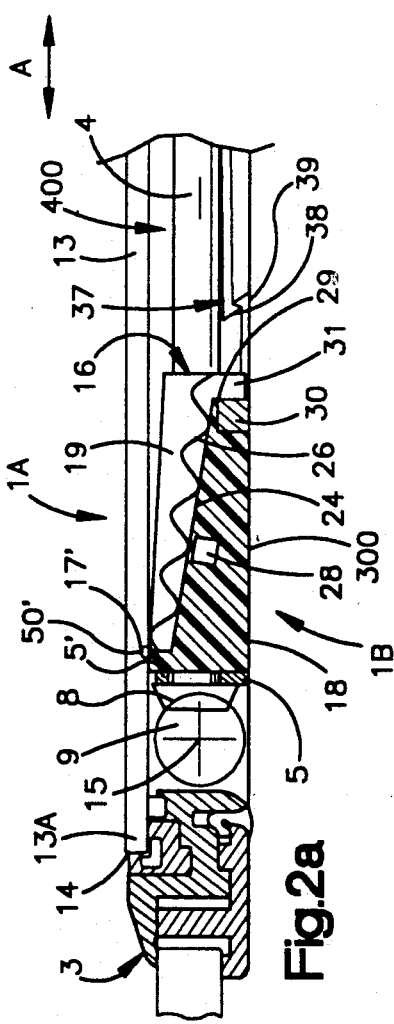
Fig.2a
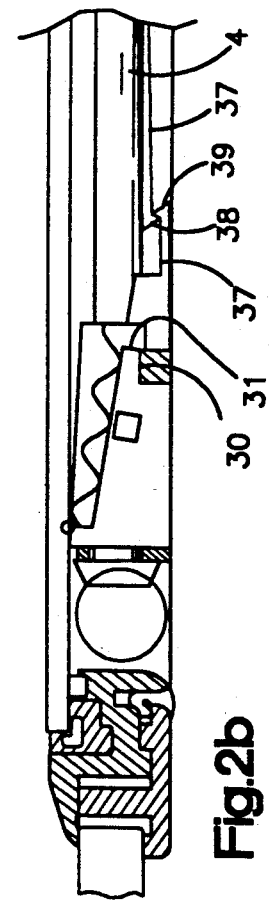
Fig.2b

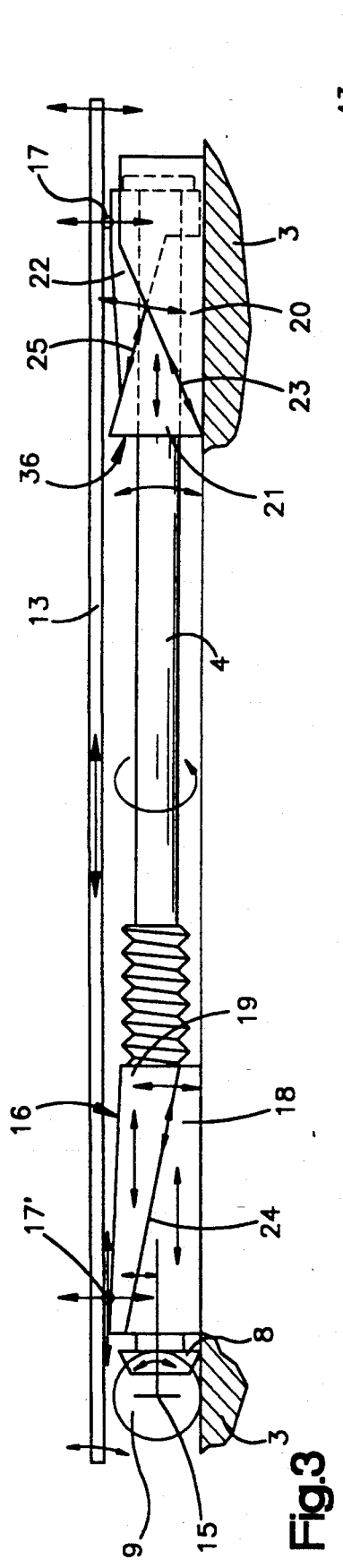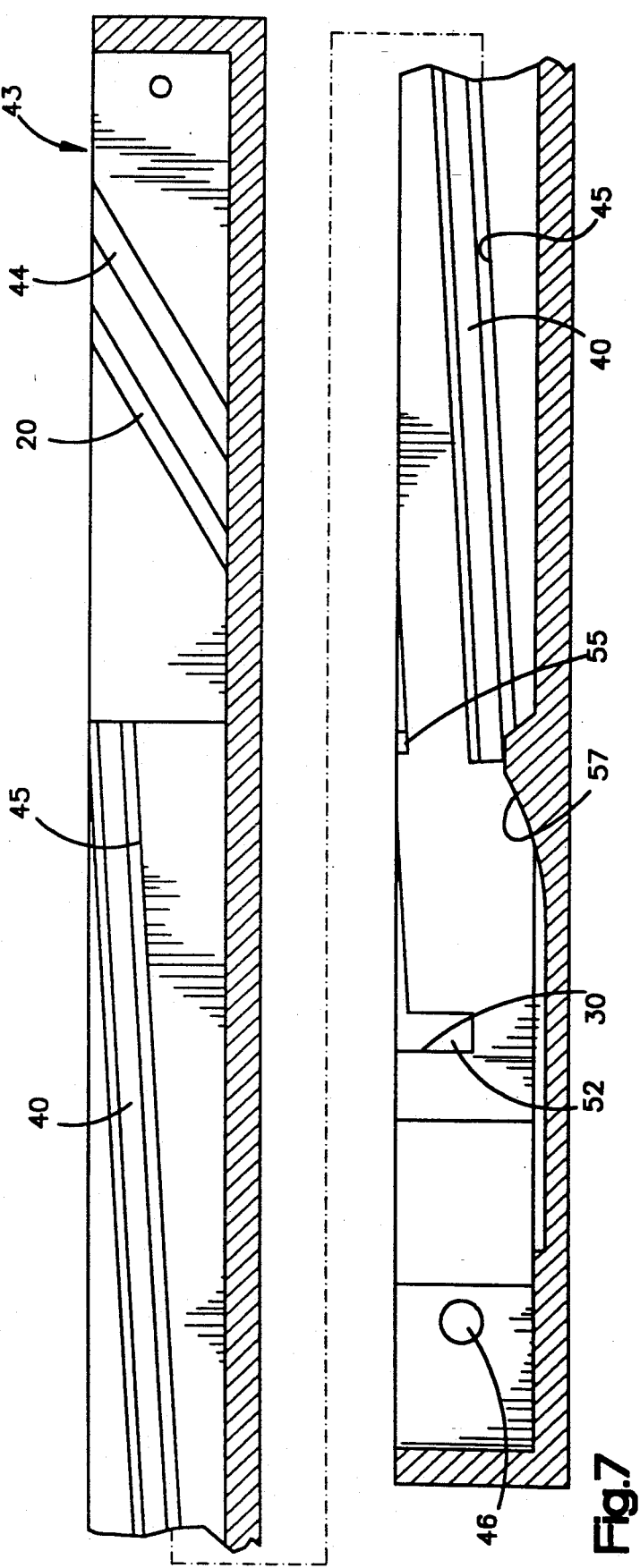

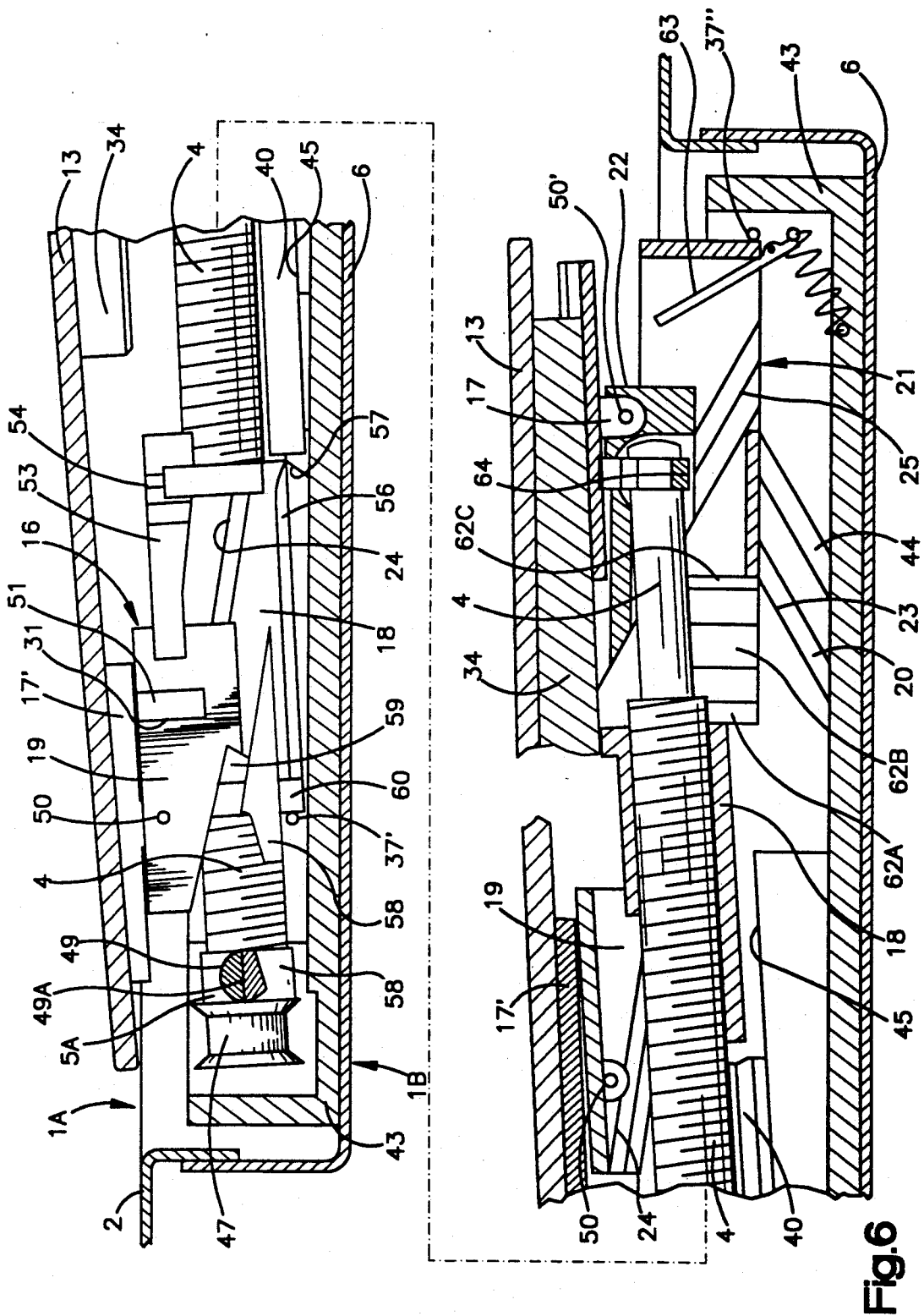

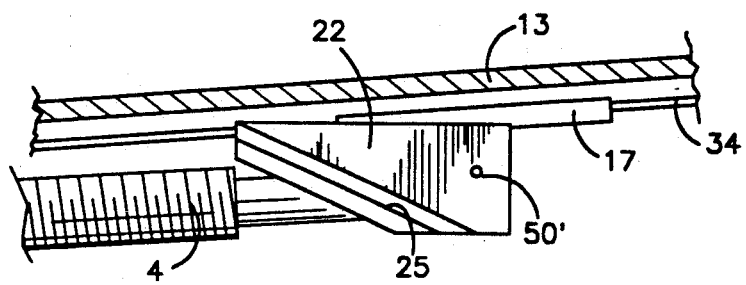
Fig.8a
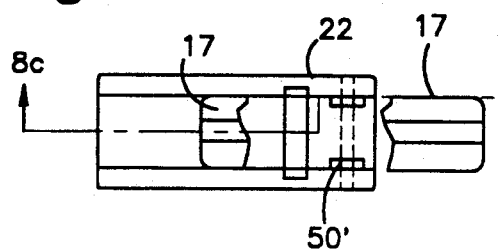
Fig.8b
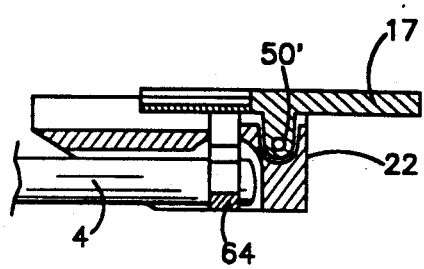
Fig.8c
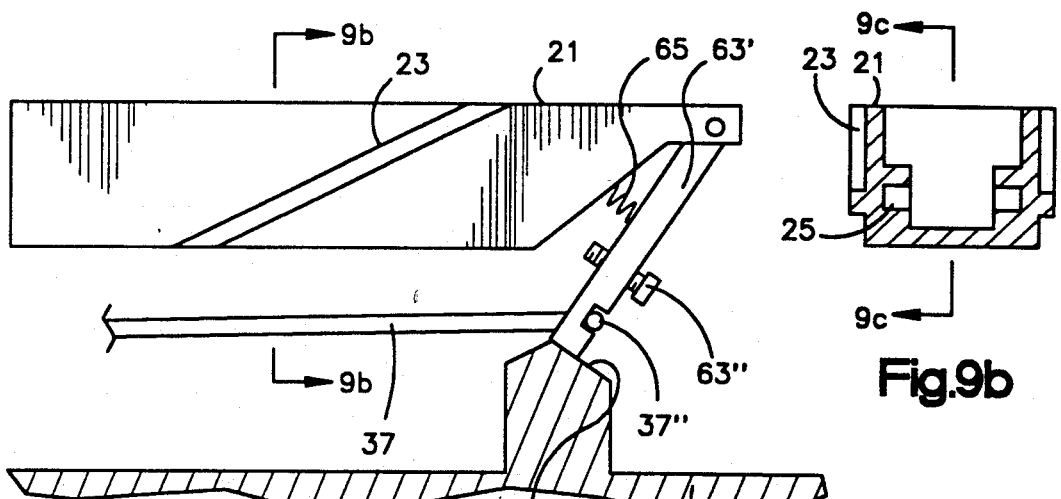
Fig.9a
Fig.9b
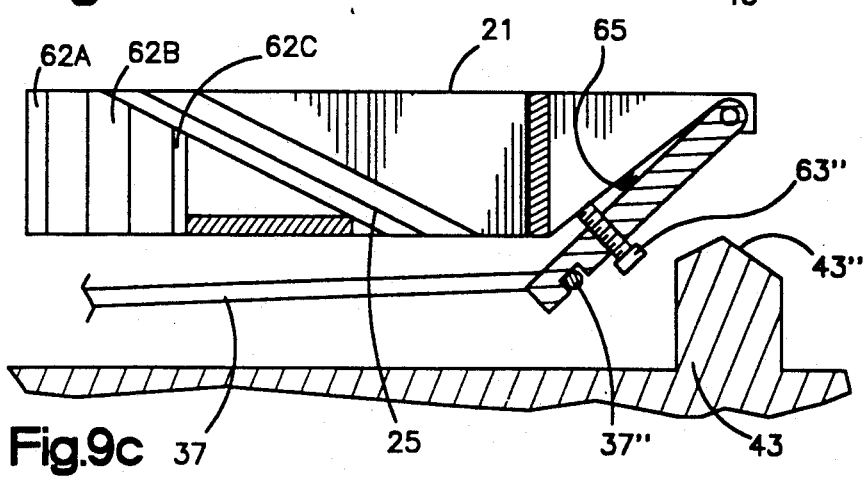
Fig.9c

SLIDING ROOF FOR MOTOR VEHICLE

CROSS REFERENCE TO RELATED APPLICATIONS

This is a continuation of application Ser. No. 664,869, field Mar. 5, 1991, now abandoned, which in turn is a continuation application Ser. No. 091,665, filed Aug. 17, 1987, now abandoned which in turn is a continuation-in-part of application International Application PCT/OP86/00748, filed on Dec. 13, 1986 and which designated the Unites States, now WO87/03847, Jul. 2, 1987. The entire disclosure of this latter application, including the drawings thereof, is hereby incorporated in this application as if fully set forth herein.

BACKGROUND OF THE INVENTION

1. Field of the Invention

The invention relates to a motor vehicle sliding roof comprising at least a plate with a front edge and a rear edge, an opening in the roof of the motor vehicle, a guide rail, a front support, a rear support, a level adjustment member, and an actuator, where the plate closes in its frontmost position the opening in the motor vehicle roof and which is at least, at its rear edge, adjustable with respect to the height level by way of rear height-level adjustment member and where the plate can be slid outside of the roof opening into various positions on one side of the motor vehicle roof, and where the sliding roof for a motor vehicle can be moved forward and backward next to its front edge by way of at least a front support in the longitudinal direction of the motor vehicle along a guide rail, and where the plate is supported at at least one rear support, where the rear support includes a rear height-level adjustment member and where the plate is slidable and adjustable in height-level with at least one actuator.

2. Brief Description of the Background of the Invention Including Prior Art

Such a sliding roof for a motor vehicle, where the closable plate can be slid both below but, in particular, above the motor vehicle, is known from the German Patent Application laid open DE-OS 34 04 541. Both the front as well as the rear support of the slidable plate are slid in the longitudinal direction of the motor vehicle according to this known motor vehicle sun roof. In fact, the two sliding motions of the front and of the rear support are performed in these sliding motions at different speeds such that the slidable plate is always simultaneously shifted in horizontal direction and slid upwardly at its rear. The rear support member on the side of the plate is spatially fixed, disposed at the slidable plate and exhibits an inclined plane, which is inclined opposite to the direction of height level adjustment. Thus, the plane is inclined downwardly in the sliding direction in order to give a lifting of the slidable plate in the direction of the sliding motion. Upon use of such an adjustment member, the inclined position of the slidable plate increases continuously with increasing sliding displacement of the plate into a rearward position. In addition it is relatively difficult to effect the height level adjustment upon moving quickly enough and to a sufficient extent out of the closure position in the plane of the motor vehicle roof in order to obtain a collisionfree sliding of the plate. These problems can only be eliminated by employing a very expensive actuating member which, in addition to providing differing rapid forward and rearward motion of the front and of the rear support, also would have to allow for changing displacement speed of the rear support along the displacement path.

In addition, a further motor vehicle sliding roof is known from the German Patent Application laid open DE-OS 31 24 325, where the rear support is mounted spatially fixed and where the height-level adjustment member is a tiltable lever which engages into a peg pin in longitudinal slots of a rail mounted on the side of the plate. Even if two height-level adjustment levers are employed, rattling noises are unavoidable in the various opening positions of such a sliding roof. Furthermore, the expenditure and efforts for achieving a sufficiently quick initial height-level adjustment of the cover plate are fairly big.

In particular, in case of known plates which are slidable above the motor vehicle roof and which are known as "spoiler version", there results the additional problem that the required closing forces have to be provided in a manner as simple as possible. This additional problem is particularly evident in case of so-called retrofit sliding roofs, as well as with other sliding roofs, where the sliding plate has to be pressed in the closure position against one seal and, in particular, against a surrounding seal.

A sliding lifting roof for motor vehicles is known from the German Patent DE-PS 30 20 675, where the cover plate can be positioned upwardly either at its rear edge or after a lowering motion, it can be shifted under the solid roof skin of the motor vehicle in a rearward direction. For this purpose, an intermediate frame is provided below the cover plate, which intermediate frame is tiltably connected to the cover plate at the front cover edge. Upon placing the cover plate into an upwardly inclined position, the intermediate frame remains in its sealing rest position relative to the roof skin, which position the intermediate frame also takes during a closure of the cover plate. Upon a lowering of the cover plate rear edge below the level of the roof skin, in contrast, the intermediate frame is lowered jointly with the cover plate and later also jointly slid with the cover plate in a rearward direction under the solid roof skin. A single drive member is provided for furnishing these courses of motion. This single drive member engages with a bolt into the connecting link guide of the intermediate frame. This link exhibits a guide region parallel to the roof plate and a further guide region that is rearwardly connected thereto and which is inclined upwardly. The guide region parallel to the cover plate allows an unimpeded forward and backward moving of the driven bolt in case of an unchanged position of the intermediate frame. Since a lever, power-transmittingly connected via a further connecting link guide on the side of the cover plate, engages with the cover plate, the forward and backward motion of the driven bolt effects a lifting or, respectively, a lowering of the rear edge of the cover plate in various positions above the fixed roof skin of the motor vehicle, as long as the bolt is disposed in a cover plate parallel region of the connecting link guide of the intermediate frame. If the driven bolt is slid rearwardly via the rear edge of the cover plate parallel part of the guide bar bracket of the intermediate frame, then it thereby lowers, on the one hand, the intermediate frame into a position below its sealing rest/closure position, and thereby bolts, on the other hand, the cover plate together with the intermediate frame. As soon as the driven bolt has reached the rear end of the guide bar bracket at the intermediate frame, a further motion of the driven bolt rearwardly effects a sliding of the cover plate, now lowered at its rear edge, to below the roof skin with the intermediate frame. Thus, the cover plate is actuated both with respect to its vertical motions as well as with respect to its horizontal motion exclusively with one single driven bolt, which engages exclusively at the rear support of the cover plate.

The advantage of this known device is associated, in particular, with the requirement of a special intermediate frame. A sliding of the cover plate rearwardly is only then possible, when the cover plate is slid to below the fixed roof skin of the motor vehicle. However, a sliding of the cover plate rearwardly, while the cover plate is rearwardly above the fixed roof skin, is not possible.

A sliding roof for motor vehicle is known from the British Patent GB-PS 884 344, where the lowering and the sliding of the cover plate to below the fixed position roof top is performed with a spindle extending in the longitudinal direction of the motor vehicle and which is driven via bevel wheels. This drive spindle is spatially fixedly disposed in a frame of the sliding roof and it is rotatably supported. A shoe, which can be moved forward and backward by the drive spindle, carries via a hinge the cover plate in the region of its front edge. The driven shoe can be moved forward and rearward by a certain amount in the closure position of the cover plate without thereby moving the cover plate rearwardly. This motion phase moves a connecting rod merely forward or backward with respect to the cover plate extending in the sliding direction of the cover plate. The connecting rod carries, at its rear end, a sliding block, which is preferably formed as a roller, which can be lifted or, respectively, lowered in this phase of motion along a spatially fixed sliding plane of the cover frame. The connecting rod carries with it the rear edge of the cover plate during this lifting or, respectively, lowering motion. As soon as the lowering process is terminated, the drive shoe rests at a counter support of the cover plate. A further sliding of the drive shoe rearwardly therefore results in a sliding of the cover plate below the fixed roof skin of the motor vehicle, where the sliding element slides together rearwardly at the rear end of the connecting rod, while the spatially fixed sliding plane is maintained for the height-level adjustment of the cover plate in its starting position. This arrangement is associated with the grave and serious disadvantage, that the sliding elements cannot remain engaged together for the rear level adjustment of the cover plate, when and if the cover plate is slid rearwardly. Therefore, a special guide shoe has to assure the desired vertical position of the cover plate upwardly and downwardly in the individual sliding position locations. In addition, the sliding elements of the height level adjustment member have to be brought into engagement with each other at the end of the forward sliding of the cover plate. In addition, this known device is not suitable to lift up this cover plate at its rear edge over the solid roof skin and to slide the cover plate in its lifted up position rearwardly above the solid roof skin of the motor vehicle.

British Patent Application GB 2,164,006A, published Mar. 12, 1986 teaches vehicle sun roofs, where a sliding sun roof for vehicle comprises a closure panel which is slidably mounted on a slide frame assembly. The reference employs a ledge mechanism of the slide handle to enable the panel to be raised pivotally from the slide frame to be unlocked for sliding movement. This reference teaches elements which are generally useful in the construction of sliding sunroofs.

The European Patent Application Number 0134042, which is based on U.S. Patent application 526,787 filed Aug. 26, 1983, and on U.S. Patent application 626,664 filed Jul. 2, 1984 teaches a sliding and venting sunroof. The reference shows the use of a motor and gear works assembly in FIG. 2. The reference employs a rack and pinion gear combination for lifting the rear of the sunroof cover upward into a vent position, and the downward reverse thereof.

SUMMARY OF THE INVENTION

1. Purposes of the Invention

It is an object of the present invention to provide an improved motor vehicle roof of the kind set forth above where, in particular, a simple means can be used for a precise guiding of the cover plate.

It is a further object of the invention to achieve an advantageous course of motion of the cover plate without a particular requirement of mental concentration by the operator person.

It is a further object of the present invention to obtain a pre-settable change of the plate inclination angle, in particular during the opening and the closing motion.

It is yet another object of the present invention to obtain height level adjustment over a range as large as possible of the height-level adjustment member disposed in particular in the rear, as well as a quick height level adjustment with respect to the sliding motion at the start of the opening motion of the plate.

These and other objects and advantages of the present invention will become evident from the description which follows.

2. Brief Description of the Invention

The invention provides a vehicle sliding roof or a sunroof for a vehicle having a longitudinal direction. The vehicle roof has an opening in the top. Preferably, the opening is in the top of a personal passenger car, a sedan, or in a limousine. The size of the opening is preferably less than one third of the total top surface of the passenger car. A plate for the opening has a front edge and a rear edge and is adapted to close in its frontmost position the opening in the vehicle roof. Preferably, the plate follows closely the contours of the top of the vehicle. The plate is further adapted to be slid outside of the roof opening into several positions on one side of the vehicle roof. A front support is supporting the plate near its front edge. A front support can be a mechanical construction which provides a rigid and geometry-defining relationship between sliding roof and top of the vehicle near the front of the sliding roof. A guide rail for guiding a forward and/or backward motion in the longitudinal direction of the vehicle of the plate along the guide rail. A guide rail, in the context of the present invention, can be a linear or curved mechanical element, which restrains motion of the plate to a defined one-dimensional path. A rear support is supporting the plate on the rear side. A rear support can be a mechanical construction which provides a rigid and geometry-defining relationship between sliding roof and top of the vehicle near the rear of the sliding roof. A height level adjustment member is associated with the rear support. Such a height level adjustment member can be a mechanical construction including a part adapted to move up and down and suitable to carry along a respective section of a plate. The height level adjustment member can be actuated with a mechanical force which is transmitted for example by a worm gear. The height level adjustment member engages the plate at a location near the rear edge of the plate for adjusting the height level of the plate versus the vehicle roof. The engagement between height level adjustment member and sliding roof can be provided by a movable part of the height level adjustment member, which movable part is solidly attached to the sliding roof. An actuating member applies a translatory force to the plate for inducing height-level adjustment and for sliding the plate relative to the height-level adjustment member in the longitudinal direction of the motor vehicle. The actuating member can include a drive which is transmitting a manual or an electric or hydraulic motor force. These forces, applied by the actuating member, can be generated originally by manual rotation of a knob, by hydraulic fluid driven by a pump, or by an electric motor energized by a battery.

A cross-axle can provide a hinge axis for the guide rail for tilting the guide rail with the height level adjustment member around the cross axle. A cross-axle can be a shaft or journal around which the guide rail can tilt. The rear height-level adjustment member can comprise two sliding elements guided relative to each other along an inclined plane. The sliding elements can be of pseudo wedge-shape, with a conceptual sharp edge side of the wedge being an approximate horizontal line running approximately perpendicular to the longitudinal direction of the vehicle. At least one of the sliding elements of the height level adjustment member is forward and backward drivable, while the plate remains substantially at rest relative to the horizontal direction of the vehicle. The height level adjustment member is preferably spatially fixed relative to the roof of the vehicle.

Preferably, the rear height-level adjustment member comprises three sliding elements guided relative to each other along joint inclined planes, each plane associated jointly to a pair of sliding elements for providing an increased total height level adjustment range. A first one of the two sliding elements is spatially fixed, and a second one of the two sliding elements is disposed above the first one of the two sliding elements An inclined plane is formed between the two sliding elements, and the plane is rising toward the rear side of the vehicle. Preferably, one of the sliding elements is guided along the guide rail, and one of the sliding elements is attached to the sliding roof. The plate is also slidable, movable, or transportable above the roof of the vehicle.

The guide rail is preferably provided as a drive spindle with an outside worm gear forming the actuating member of the plate. An end of the drive spindle, which end is not directly engaged with a driving force, is freely rotatable supported in an upper one of the sliding elements on the plate side.

An inclined plane, formed between a spatially fixed lower sliding element and a sliding element, can be disposed above the spatially fixed sliding element, and is inclined in a direction of height level adjustment and in a shifting direction of the plate. A spring is advantageously disposed between two sliding elements and the spring is acting in the longitudinal direction A of the vehicle in the sense of providing a mutual shifting of the sliding elements. A first detent stop can be disposed at a first sliding element. A second detent stop can be disposed at a second sliding element for corresponding to the first detent stop, where the sliding elements form part of the height level adjustment member. Alternatively, a detent stop is disposed at a sliding element of a respective height level adjustment member for allowing tensioning of the spring and the detent stop becomes effective during a forward and backward shifting of the driven sliding element.

An axle can extend crosswise relative to the longitudinal direction of the vehicle, and the sliding elements are disposed in each case at the side of the plate to allow tilting at the plate. A front height level adjustment member can be formed of two sliding elements, which sliding elements are slidingly guided along an inclined plane. A sliding element of the front height level adjustment member, which sliding element is not itself driven, can be exclusively shifted forward and backward in its height-level position reached during opening position of the plate. A lower sliding element of the front height level adjustment member can be driven to shift forward and to shift backward. At the initial phase of the opening motion of the plate, a lower sliding element is preferably exclusively slidable in a sense of a height-level adjustment of the plate. Only after reaching approximately a desired height level of the plate, the lower sliding element is further shiftable to the rear in the sense of approximately a horizontal sliding of the plate. The lower sliding element can be shifted such during a closure motion of the plate that the plate is initially exclusively shifted forward in a longitudinal direction of the vehicle, and only then the plate is adjusted in its height level into the plate's closure position disposed in the plane of the vehicle roof.

A pulling member can engage a sliding member in a sense of shifting the sliding member and can actuate it in at least one shifting direction. A detent stop can be attached to the pulling member. A detent stop can be attached to a lower sliding element of a front height-level adjustment member.

A pushing pressure member can engage a sliding member in a sense of shifting the sliding member and can act in at least one shifting direction. A detent stop can be attached to the pushing pressure member. A detent stop is preferably attached to a lower sliding element of a front height-level adjustment member.

One of the sliding elements of the height level adjustment member can includes means for driving said adjustment members forward and backward while the plate remains at rest relative to the longitudinal direction of the vehicle. An end-side angle drive can include bevel wheels and the drive can be actuatable by the drive shaft for actuating at least one actuating member.

The actuating member and the height-level adjustment members can include substantial components made of plastic. A locking means can be furnished for locking a height level adjustment member in the height level reached in its opening position against height-level changes. A second spatially fixed guide rail can be used for front support. The guide rail is preferably inclined relative to the roof of the vehicle such that it is disposed in parallel to the shifting path of the front support. A second heightlevel adjustment member can be employed for lifting and lowering the plate in the enter region of its front edge. A cam disk can be provided at the second height level adjustment member, and the cam disk can be rotated in the shifting direction of the plate. A second height-level adjustment member can be disposed close to the region of the front edge of the plate. A wind deflector is preferably disposed at a front frame brace of the a chassis frame and having a wind deflector surface. A lever is used for lifting up or lowering down the wind deflector surface, where the tilting axis of the lever is disposed at the rear lever end, as seen in travel direction of the vehicle.

A transmission gear with a drive wheel is advantageously disposed between the plate and the front and rear support, where the drive wheel runs, on the one hand, on a first rail spatially fixed at the frame and movable back and forth from the front support in the shifting direction of the plate and, on the other hand, with a second rail solidly connectable to the plate. The transfer ratio of the transmission gear is smaller than 2 to 1.

According to a preferred embodiment of the invention, the guide rail is formed as a drive spindle providing an actuating member where, in particular, the spindle comprises an outside-disposed worm thread. In principle, the sliding of the plate can also be achieved with a Bowden cable or the like. Advantageously, the tiltable guide rail assumes a double function, that is, the carrying and guiding functions, on the one hand, as well as the drive function, on the other hand. Height level adjustment members can be provided in the two end regions of the guide rail and, in fact, both between the plate and the guide rail, as well as between the guide rail and the motor vehicle roof, such that an extremely large variety of motions are possible for moving the plate.

In addition, the motor vehicle sliding roof according to the invention has the following advantages:

The slidable plate is guided exactly and precisely in all opening positions and, therefore, it has an extremely low noise level even during fast driving of the motor vehicle or in case of a wind hose.

The motor vehicle sliding roof can be constructed from very few simple parts, in particular, from parts made from plastic, and it can be mounted in a comparatively short time.

The closure forces required for a pressing of the plate into the closure position against seals is assured without additional or complex building components.

Advantageous embodiments of the subject-matter of the invention effect quick and, in particular, successive height-level adjustments of the plate independent of the sliding motion of the cover plate. Furthermore, a sufficiently large ventilation position, in case of a plate which is not moved and slid in the opening sense, can be obtained even in case of a particularly flat and low constructed sliding roof. The actuation of the plate by a single actuator member, as well as a preset adjusted inclined positioning of the rearwardly moved plate, can be assured.

The recited components employed according to the invention are not subject to special conditions with respect to their size, their form, their material selection, and the technical conceptions, such that in the field employed in each case, the known selection criteria can be employed without limitation.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 2a is a schematic sectional view of the motor vehicle roof according to FIG. 1 along section line II—II in the closure position as a partial view, FIG. 2b is a schematic sectional view of the motor vehicle sliding roof according to FIG. 2a, however in a first lift up position, FIG. 3 is a view of the same motor vehicle sliding roof of FIG. 2a to illustrate the operating principle of the sliding roof, FIG. 6 is a sectional view of the motor vehicle sliding roof according to FIG. 4 according to a section along section line V—V, however with the cover plate lifted up in the rear in the frontmost position as well as in the rearmost position, where the representation in FIG. 6 directly corresponds to the representation in FIG. 4 as far as the cover plate is in its frontmost position with the front and the rear lifted.

FIG. 7 is a vertical section of a guide element of the same motor vehicle sliding roof as illustrated in FIG. 4, where this FIG. is a section along section line VII—VII of FIG. 4, FIG. 8a is a view of the same motor vehicle roof illustrated in FIG. 4 with a detailed representation of the region of the rear height-level adjustment member in a side view, FIG. 8b is a view of the same motor vehicle roof illustrated in FIG. 4 with a detailed representation of the region of the rear height-level adjustment member in a plan view from the top in part opened up, FIG. 8c is a view of the same motor vehicle roof illustrated in FIG. 4 with a detailed representation of the region of the rear height-level adjustment member in a vertical section along the section line VIIIc—VIIIc of FIG. 8b, FIG. 9a is a sectional view of a rear height level adjustment member of a motor vehicle sliding roof in an alternate embodiment of the position adjustable center sliding element in a side view, FIG. 9b is a sectional view of a rear height-level adjustment member of a motor vehicle sliding roof in an alternate embodiment of the position adjustable center sliding element in a side view in a section along section line IXb—IXb of FIG. 9b, FIG. 9c is a sectional view of a rear height-level adjustment member of a motor vehicle sliding roof in an alternate embodiment of the position adjustable center sliding element in a side view in a section along section line IXc—IXc of FIG. 9a, FIG. 10a is a sectional view of the motor vehicle roof according to FIG. 1 along section line X—X in a first operating position.

DESCRIPTION OF INVENTION AND PREFERRED EMBODIMENT

Figure 1:
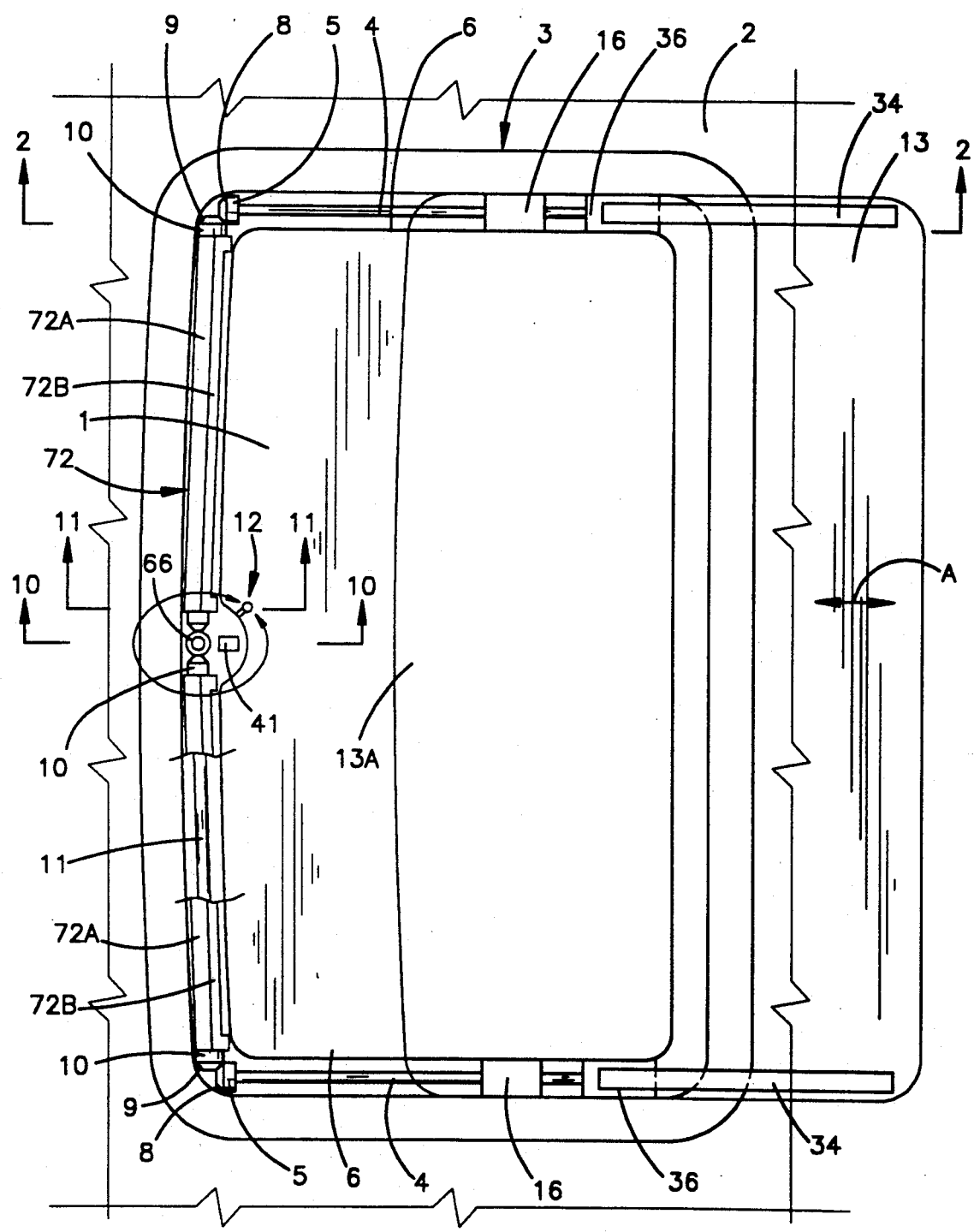
FIG. 1 is schematic a top plan view onto a motor vehicle sliding roof.

In accordance with the present invention there is provided a motor vehicle sliding roof or a motor vehicle sun roof, which comprises at least a plate with a front edge and a rear edge, an opening in the motor vehicle roof, a guide rail, a front support, a rear support, a height-level adjustment member, and an actuating member. The vehicle roof 2 has an upper side 1A and a lower side 1B. The plate 13 closes in its front position the opening 1 in the motor vehicle roof 2. The plate is, at least at its rear edge, adjustable in height level by way of a rear height-level adjustment member. The plate is shiftable outside of the roof top opening 1 in various positions on one side of the motor vehicle roof 2. The plate can be moved forward and backward, close to its front edge, with at least one front support in longitudinal direction A of the motor vehicle along the guide rail. The plate is supported with at least one rearwardly disposed rear support 36, where the rear support is associated with and provides the rear height-level adjustment member. The plate is height-level adjustable and shiftable by way of at least one actuating member.

The guide rail is constructed tiltable with rear height-level adjustment member around a horizontal cross axis 15. The plate 13 is guided slidingly with respect to the rear height-level adjustment member and/or the guide rail in a longitudinal direction A of the motor vehicle.

Alternatively, the rear height-level adjustment member comprises three sliding elements 20, 21, 22, which are guided along inclined planes 23, 25 which are pair-wise joined and the guiding is provided in particular in a view of an increased height-level adjustment. At least one of the sliding elements 20, 21, 22 is drivable individually in forward and backward direction of at least the rear height-level adjustment member while the plate is in still-standing position relative to the longitudinal direction A of the vehicle. The height level adjustment member can be guided slidingly with respect to the plate 13 in the longitudinal direction A of the motor vehicle and can be disposed in a spatially fixed position relative to the motor vehicle roof 2. Alternatively, the height level adjustment member can be disposed spatially fixed relative to the plate 13 and can be guided slidingly in the longitudinal direction A of the motor vehicle relative to the motor vehicle roof 2.

Alternatively, the height-level adjustment member can be slidingly guided relative to plate 13 in the longitudinal direction A of the motor vehicle and it can be spatially disposed relative to the vehicle roof 2 such that the inclined plane 23, formed between the spatially fixed sliding element 20 and the sliding element 21 disposed above the spatially fixed sliding element 20, increases toward the rear. The plate then is shiftable above the motor vehicle roof.

The rear height-level adjustment member can comprise two sliding elements 20, 21 or 22, respectively, guided slidingly with respect to each other and guided along an inclined plane 23, or 25, respectively.

The rear height-level adjustment member can preferably comprise three sliding elements 20, 21, and 22, which are guided along inclined planes 23 and 25 which are jointly in common and sliding with respect to each other and in particular in the sense of an increased range of height-level adjustment.

The guide rail can be formed as a drive spindle forming the actuating member 4 of the plate 13 and in particular a drive spindle with an outside disposed worm gear.

The inclined plane 23 formed between a spatially fixed lower sliding element 20 and a sliding element 21 disposed above the spatially fixed lower sliding element 20, can be inclined in the direction of the height-level adjustment and in the direction of the shifting of the plate 13.

A non-driven end of the drive spindle ca be supported freely rotatable in one of the sliding elements 20, 21, or 22, and in particular in an upper sliding element 22, which can be disposed on the side toward the plate.

A spring 26 or 27, respectively, can be disposed between the sliding elements 18 and 19 or, respectively, 21, 20 and/or 22 of at least one of the height-level adjustment members acting in the sense of a mutual shifting of the sliding elements in the longitudinal direction A of the motor vehicle.

Corresponding end stops 28 or, respectively 29, disposed at the sliding elements 18 and 19, respectively 20 to 22, belonging to one of the height-level adjustment members, can limit the relaxation of the spring 26 or, respectively, 27 and can allow the further shifting of the plate 13.

At least one detent stop 30 and 31 or, respectively 38 and 39, allowing a tensioning of the spring 23 or, respectively 27, can be disposed at one of the sliding elements 19 or, respectively, 21 of the respective heightlevel adjustment member and the end stop can become effective upon forward or backward shifting of the driven sliding element 18 or, respectively, 21.

Sliding elements 19 or, respectively, 29 can be disposed tiltable at an axis disposed and extending crosswise to the longitudinal direction A of the motor vehicle, where the sliding elements are disposed on the side of the plate.

The front support 16 can be formed as a front height-level adjustment member and, in particular, can comprise at least two sliding elements 18 and 19 slidingly guided along an inclined plane 24.

The lower sliding element 18 of the front height-level adjustment member can be shiftable in forward and backward direction.

The lower sliding element 18 can be shifted at the start of the opening motion of the plate 13 initially exclusively in the sense of a height-level adjustment of the plate 13 and only upon reaching of a desired height level can be further shifted in the sense of a shifting of the plate in a rearward direction.

The lower sliding element 18 can be shifted upon a closing motion of the plate 13 such that the plate 13 initially is shifted exclusively in a longitudinal direction A of the motor vehicle forward and only successively positioned in its closure state disposed about the plane of the vehicle roof.

There can be provided at least one pulling member 37 or a pushing pressure member engaging a sliding element 21 in the shifting sense and acting in a shifting direction.

The pulling member 37 can be provided with a detent stop 38 and a detent stop 39 can be disposed at the lower sliding element 18 of the front height-level adjustment member for engaging the detent stop 38.

At least one actuating member 4 can be actuated via an end-side bevel gear (bevel wheels 8 and 9) by way of a drive shaft 11.

The actuating members and/or the height-level adjustment members can be formed of components made of plastic.

One of the sliding elements 20, 21, or 22 of the rear height-level adjustment member can be individually driven for shifting in forward and rearward direction while the plate is in a still-standing position with respect to the longitudinal direction A of the motor vehicle.

At least one height-level adjustment member can be locked at least in its height-level position reached in opening position of the plate against height-level adjustments.

A sliding element 19 not individually driven of the front height-level adjustment member can be shifted forward and backward exclusively in its height-level position reached in opening position.

A further spatially fixed guide rail 40 for the front support 16 can be disposed such that the spatially fixed guide rail 40 is inclined in respect to the roof panel such that it is disposed parallel to the shifting path of the front support 16.

A further height-level adjustment member 41 disposed spatially fixed at the vehicle roof can serve for lifting and lowering the plate 13 in a middle region of its front edge 13A.

A further height-level adjustment member 41 can exhibit a cam disk 42 rotatable in the shifting direction of the plate 13.

A wind-draft deflector 72 can be disposed in the area of the front edge 13A at the front frame brace bar 7 of the chassis frame 3 and a wind-deflector surface 72A can be lifted and lowered by way of a lever 72B, whereby the tilting axis 72C of the level 72B is disposed at the rear lever end relative to the travel direction.

A transmission gearing 73 can be provided between the plate 13, on the one hand, and the front and rear support 16 and 36, on the other hand. The transmission gearing 73 can have a drive wheel 73B disposed, on the one hand, at a first rail 73A which is spatially fixable at a frame 3, with the front support 16 shiftable forward and backward in the shifting direction A of the plate 13 and, on the other hand, with a solidly connected second rail 73C solidly connected to the plate 13.

The transmission ratio of the transmission gear 73 can be smaller than 2:1.

Referring now to FIG. 1 there is provided a roof opening 1 of a motor vehicle roof 2 which opening is, for example, surrounded and framed with a frame 3 made of plastic and/or metal. The vehicle roof 2 has an upper side 1A and a lower side 1B. The frame 3 is a component of a retro-fittable motor vehicle sliding roof. Alternatively, one can employ a frame already integrated into the motor vehicle roof during the production of the motor vehicle. The frame 3 preferably has an L or U-shaped profile in the longitudinal direction of the motor vehicle, which is in particular open for a nearly complete accepting of the required component parts for moving the motor vehicle sliding roof. Preferably, in each case, one one-piece drive spindle, which is rotatable and axially not movable, is supported within the frame braces 6 directed in the motor vehicle longitudinal direction A as actuating members 4 of a slidable plate 13, which closes in its front-most position the roof opening 1. A guiding rail 400 is provided for guiding the plate 13 in the vicinity of its front edge 13A in a forward and backward motion along the guide rail 400 in the longitudinal direction A of the vehicle. The guide rail 400 comprises the actuating members 4 for displacing the plate 13 and adjusting the height of the plate 13. The spindles are provided with end-side bevel wheels 8 at the front side of the roof opening 1. The bevel wheels 8 engage bevel wheels 9 of drive shafts 11 supported in the frame front part on bearing blocks 10. The drive shafts 11 terminate in the frame middle in a crank mechanism 12 of a conventional kind.

As can be recognized from FIGS. 2a to 2e, the plate 13 is provided with a horizontal cross-axis 15 or a similar support member at its front edge 14 around which the plate 13, supported by the front support 16, can be tilted. The plate 13 has a front edge 13A and a rear edge 13B. The rear edge of the plate 13 is adjustable in its height level by way of an actuating member which can be a guide web with parallel running pull and/or pressure element or a Bowden cable, or the like. Preferably, a drive spindle made of plastic with a worm thread is employed. The rear edge of the plate 13 preferably is provided for this purpose with a lower, a middle, and an upper sliding element 20 to 22, which jointly form a height-level adjustment member 200. However, in principle, two sliding elements would be sufficient to perform the functions required. The rear height-level adjustment member can further carry out the function of a rear support 36. On the side of the plate, there is arranged a rear support member 17, which is preferably provided with a further cross-axis 50 for a slight tilting motion between the height-level adjustment member and the plate 13. A similar support member 17' with a cross-axis 50' can be provided in the region of the front support 16, which is, in particular, spatially fixed relative to the cover plate 13.

In addition, the front support 16 can be formed as a height-level adjustment member 30 and, for this purpose in particular, it can be provided with two sliding elements 18 and 19, similarly as in the case of the rear height-level adjustment member, a lower and an upper sliding element is employed.

The hinge points of the plate 13 at the front support and at the rear support can be disposed immediately above the drive spindle or, alternatively, can be displaced to the side relative to the drive spindle or, respectively, be displaced relative to another actuating member.

The front support 16 is provided with a threaded sleeve, which is not illustrated in detail in the drawing and which is disposed within a corresponding opening. The threaded sleeve moves upon rotation of the spindle the front support 16 in a longitudinal direction A of the motor vehicle. The front support 16 is formed as a front heightlevel adjustment member in the drawing, in order to effect, at the start of the opening path of the plate 13, a pressure relief of a seal possibly provided between the frame 3 and the plate 13. The height-level adjustment needs to amount to only a few millimeters, for example, from about 5 to 10 mm. For this purpose, the height-level adjustment member, which is the support 16, comprises a lower sliding element 18 which can be moved forward and backward unimpeded by the drive spindie and an upper sliding element 19, hingedly connected to the support member 17' of the cover plate 13 and spatially connected relative to the plate 13. The sliding elements 18 and 19 are slidably guided along an inclined plane 24 disposed between them and relative to each other, for example, by a dove-tail connection. A spring 26 acts between the sliding elements 18 and 19 in the sense of a mutual shifting of the sliding elements 18 and 19 in the longitudinal direction A of the motor vehicle. This spring is under maximum tension in FIG. 2a and it is released, according to FIGS. 2c to 2e, up to a residual tension.

The relaxing of the spring 26 is limited by corresponding detent stops 28 and 29 provided at the sliding elements. For this can serve a cog or cam that is protruding sideways at the sliding element 18, and a pin that is protruding at the sliding element 19 over the sliding element 18 but not protruding the stop 28. These stops 28 and 29 are associated with the following function: If the plate 13 is to be lifted up in the front at the start of the opening path for a light lifting in order to relieve the seal, then the sliding element 18 is slowly shifted rearwardly, which sliding element 18 is carried preferably by the drive spindle itself and which is moved by a rotation of the drive spindle element (actuating member) via the bevel wheel 8. An intermediate position of this step is illustrated in FIG. 2b. The angle of inclination of the inclined plane 24 toward the rear bottom is slight, for example 10°. The spring 26 is to be constructed of sufficient strength and the mutual friction of the sliding elements 18 and 19 is correspondingly low. Antifriction elements could be provided in order to decrease friction between the sliding elements. The sliding element 18 can be moved rearwardly upon a gradual release of the spring 26 relative to the sliding element 19 based on the rearward shifting of the slide element 18. In contrast and caused by the correspondingly large force of the spring 26, the sliding element 19 and the plate 13 are maintained in their original longitudinal position with a stop 31 of the sliding element 19 against a stop 30 on the frame side. Only if the detent stops 28 and 29 of the sliding elements 18 and 19 come to rest mutually, then a further rearward shifting of the sliding element 18 by rotation of the drive spindle effects a shifting of the plate 13 in a rearward direction. The detent stops 28 and 29 are thus disposed such that they allow the further shifting of the plate 13 and that they limit the release of the spring 26.

The sliding element 18 extends always parallel to the extension direction of the drive spindle 4 and the same holds for the sliding element 19 which is guided substantially without play in the plane 24 versus the sliding element 18. The change of inclination between the drive spindle and the plate during the opening and closing of the motor vehicle sliding roof, which is to be illustrated further below, leads also to a slight tilting of the height-level adjustment member 16 versus the plate 13 around the cross-axis formed by the support member 17'.

Figure 2C:
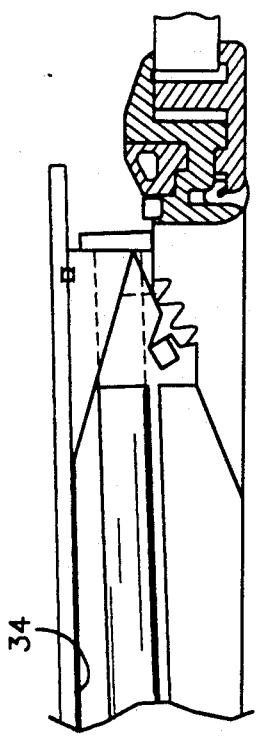
FIG. 2c is a schematic sectional view of the motor vehicle roof according to FIG. 2a, however in a second lift up position.
Figure 2D:
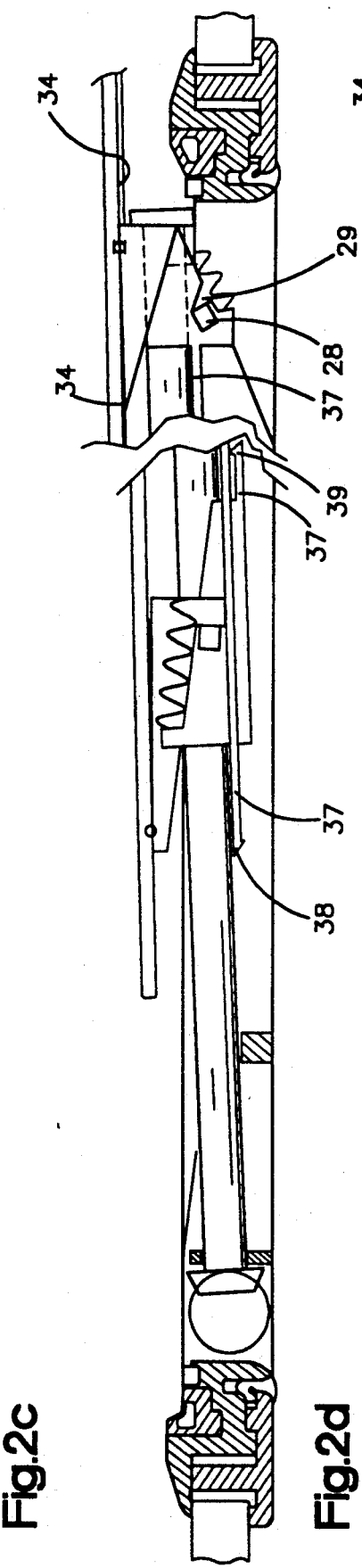
FIG. 2d is a schematic sectional view of the motor vehicle roof according to FIG. 2a, however in a first shifted displacement motion.
Figure 2E:
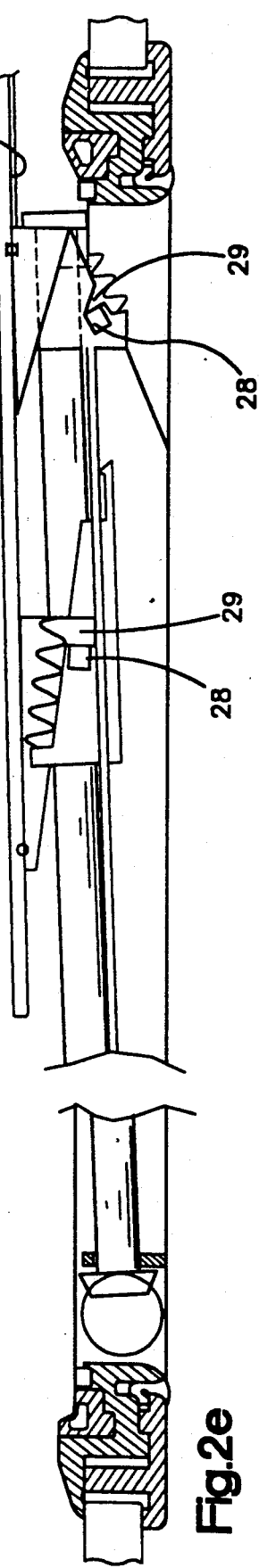
FIG. 2e is a schematic sectional view of the same motor vehicle sliding roof as in FIG. 2a, however in a second shifted displacement position.

Upon sliding of the sliding element 18 in a forward direction by a correspondingly inverted rotation of the drive spindle, for example from the opening position according to FIG. 2e, then the sliding element 19 and thus the plate 13 are taken along by the driven sliding element 18, since the spring 26 supports the detent stops 28 and 29 between the two sliding elements 18 and 19. As soon as the stop 31 of the sliding element 19 comes to rest at the corresponding frame-side stop 30, as illustrated in FIG. 2c, then, upon a further sliding of the sliding element 18 in a forward direction, a further shifting of the plate is prevented and the spring starts to relax, since now the sliding elements 18 and 19 perform a relative motion and effect thereby a lowering of the plate 13 in its front region. As soon as the plate 13 comes to rest in a vertical position with a frame-side stop or a seal, then the plate 13 is tensioned downwardly upon a further shifting of the sliding element 18 forwardly with a predeterminable and adjustable size force, such that the desired closing force can be provided without problems. Despite the use of one single drive member, it is achieved for such a height-adjustment member that, initially, the height-level adjustment and only then the longitudinal shifting of the plate 13 or, respectively, the reverse sequence of motion, is effected by the actuating member 4. The guiding of all construction elements with respect to each other is quasi without play such that, even in case of an open motor vehicle sliding roof, no rattle sounds or the like can be generated.

The rear height-level adjustment member, which at the same time accepts the function of the rear support 36 of the plate 13, is constructed in its basic principle as the front height-level adjustment member. This means, it comprises at least a drivable sliding element 21 and at least a second sliding element 22 and/or 20, where, between the sliding element 21 on the one hand, and the sliding elements 20 and/or 22 on the other, there is preferably acting again a spring 27 in the sense of a mutual shifting of the sliding elements in the longitudinal direction A of the motor vehicle.

The rear height-level adjustment member can also be mounted spatially fixed as a whole relative to the plate 13 and can be slidable relative to the frame 3 of the motor vehicle roof 4 in the longitudinal direction A of the motor vehicle jointly with the plate 13 in a sliding motion. The preferred embodiment illustrated in the drawing exhibits the reverse path, i.e. the rear height-level adjustment member is overall spatially fixed with respect to the frame 3, not considering the mutual shifting of the sliding elements, while the rear height-level adjustment member is slidably movable relative to the plate 13 and via a corresponding guide 34 or, respectively, 35, at the plate 13, on the one hand and, the rear height-level adjustment member on the other hand relative to the plate 13 in the longitudinal direction of the motor vehicle. Otherwise, the height-level adjustment member is guided substantially without play.

The sliding element 20 of the rear height-level adjustment member is disposed spatially fixed according to the preferred embodiment illustrated in the drawing relative to the motor vehicle roof 2. In the most simple case, the sliding element 20 can comprise a peg pin engaging with the corresponding sliding element 21 or can comprise a corresponding slot, into which a peg pin of the sliding element 21 engages and which peg pin is slidably movable there in the longitudinal direction A of the motor vehicle, but which otherwise is guided substantially without any play. The sliding plane thus formed by the sliding elements 20 and 21, which in principle can also take a curved course, where preferably the radius of curvature is constant going in longitudinal direction. This also holds for the other inclined planes 24 and 25 which again can be substituted by a curved surface with substantially constant radius of curvature. Thus, the sliding elements 20 and 21 overall provide an inclined plane 23, which is inclined preferably in the direction of the height-level adjustment and of the shifting of the plate 13. This is in the example illustrated in FIG. 2 toward the rear upward direction. The maximum angle of this inclined plane relative to the plane of the roof of the motor vehicle can amount from about 5° to 45° and is preferably between from about 10° to 30°.

In principle, it is possible that the sliding element 21 is driven only by the plate 13 immediately in shifting direction. For this purpose, simple engagement and locking elements can be used, which assure a further shifting of the plate, at least in the highest height position reached by the height-level adjustment member. For this purpose, the sliding element 21, for example via guides 34 and 35 with respect to the plate 13, at least indirectly, is guided or, respectively, reversed in a sliding motion.

Preferably, the sliding element 21, however, in the case of the plate 13 in the rest position, is driven itself in the sense of a sliding in the longitudinal direction A of the motor vehicle, i.e. not by the plate 13 itself. In this manner, the height-level adjustment and the shifting of the plate 13 can successively follow each other, which results in a substantially more exact guiding and adjustment of the plate 13 and which gives more pleasant ventilating properties of the motor vehicle sliding roof.

In particular, in case of sliding roofs (Spoiler version), which are liftable in the rear and up above the motor vehicle and which are slidable above the motor vehicle roof in a rearward direction, but also in case of the sliding roofs which can be realized according to the invention, which are shifted upon opening under and below the motor vehicle roof, it is desirable that the plate 13 initially is adjusted at the rear edge with respect to the height level even without rearward shift, in particular in order to achieve an inclined position and ventilation effect in the accommodation space of motor vehicle travellers. For this purpose, a lifting of the rear plate edge by, for example, 2 cm or more has proven to make sense. If one employs two sliding elements forming an inclined plane relative to each other as a height-adjustment member, then the height level difference given by the lowest and highest point of the inclined plane can only in part be employed and preferably only half of such difference, and at most, two thirds of such distance, if a mutual guiding of the sliding elements should be maintained. Thus, in order to achieve a height-level adjustment path of 2 cm, there would be required a height-level difference at the inclined plane of about 4 cm, and the motor vehicle sliding roof would have a corresponding thickness. In order to maintain the head room clearance in the space of the travellers, however, it is desirable to construct motor vehicle sliding roofs which are constructed as flat as possible. In order to meet the opposing requirements for a sufficient height-level adjustment and for a construction as flat as possible of the motor vehicle roof upon use of sliding elements as height level adjustment members, there are employed preferably more than two sliding elements, in particular three sliding elements as height level adjustment members. Correspondingly, a sliding element 22 is illustrated in FIGS. 2a to 2e, which forms with the sliding element 21 a further inclined plane 25. The sliding elements 21 and 22 can be guided along this sliding plane under simultaneous height-level adjustment of the plate 13 via dove-tail grooves, via slots, and via peg pins, or the like, to provide mutual shifting.

Preferably, the sliding element 22 is guided longitudinally shiftable relative to the plate-side guide 34 to the plate 13 via the plate-side support member 17 and the guide 35 and, in addition, the sliding element 22 receives in a recess extending in the motor vehicle longitudinal direction A the rear end of the drive spindle (actuating member 4) in a rotatable fashion, whereby neither the drive spindle nor the sliding element 22 exhibit in the mutual contact region advance teeth, such that the drive spindle can rotate freely in the sliding element 22 and thereby the sliding element 22 remains maintained always in the fixed end position of the drive spindle. Consequently, the drive spindle is tilted at its rear edge upwardly upon lifting of the plate 13. Thereby, the bevel wheels 9 of the forwardly disposed drive shafts 11 perform the function of a pivot bearing and the drive spindle is maintained in position by a bearing block 5 with a vertical longitudinal slot 5'.

The concrete embodiment illustrated in the drawing shows that the sliding element 21 slides along the inclined plane 23 upwardly or downwardly and effects already, based on this, a first lifting or lowering of the plate 13. Simultaneously, the sliding element 21 is shifted versus the sliding element 22 in the sense of a further height level adjustment. For this purpose, a guide 34 or, respectively, 35 can comprise a rear detent stop for the sliding element 22 relative to the plate 13, which is not separately illustrated in the drawing. In this way, a shifting of a single sliding element can achieve a double height level adjustment. For this purpose, the sliding element 21 is provided in the embodiment according to FIG. 2a to 2e with its own drive, which comprises for the shifting rearwardly a tensioned spring 27 and for the shifting forwardly a two-part pulling member 37, which engages the sliding element 18 driven forward and backward by the drive spindle 4.

The following course of motion results for the rear height-level adjustment member: Initially, exclusively a height level adjustment is effected starting from the closed position of the plate 13 illustrated in FIG. 2a. The shifting of the sliding element 18 of the front height-level adjustment member effected by a rotation of the drive spindle relieves increasingly the spring 27 of the rear height-level adjustment member with simultaneous shifting of the sliding element 21 of the rear height-level adjustment member. Also the spring 26 becomes increasingly relieved because the pulling member 37 is limited with respect to length by a peg pin engaging into a long slot or by corresponding detent stops 38 and 39. The detent stop 38 and the stop 39 therefore have the same function as the stops 31 and 30 of the front height-level adjustment member. Similar detent stops 28 or, respectively, 29 limit the shift path of the sliding element 21 in a rearward direction with respect to the sliding element 20 and 22, and similarly the sliding elements 18 and 19 are limited by the detent stops 28 and 29. Thus, the relaxation of the spring 27 is limited to a pre-determined amount. The springs 26 and 27 are still sufficiently tensioned in this position, where the highest height-level adjustment of the rear and simultaneously also of the front height-level adjustment member is achieved, in order to maintain the sliding elements 18 and 19 or, respectively, 20, 21 and 22 in this position even when the plate 13 is shiftingly slid again forwardly from the opening position. For this purpose, it is for example sufficient, if the spring 27 is fixed at the frame 3 of the motor vehicle roof. The spring 27 can extend in particular in horizontal direction while the spring 26 extends preferably substantially parallel relative to the inclined plane 24.

The detent stops at the sliding element 21 relative to the sliding elements 20 and 22 can be tuned to the stop 38 and the stop 39 of the pulling member 37, as well as the stops 28 to 31 of the front height-level adjustment member, such that the front and rear height-level adjustment member reach simultaneously the maximum height level, such that the stop 39 starts to shift away from the stop 38 if the sliding element 18 starts to move the plate 13 in a rearward direction. In case of a reverse direction of motion, as soon as, the actuating member 4 of the stop 39 moving forwardly reaches the stop 38, then the sliding element 21 is successively pulled forward against the pull of the thereby tensioning spring 27, such that the height level adjustment of the rear height-level adjustment member is started. Also, in case of the rear height-level adjustment member, sufficiently large closing forces can be obtained in this way without a special construction part or a special drive becoming necessary.

If the drive spindle — as mentioned above — is lifted and lowered at its rear end by way of a sliding element 22 synchronously with the plate 13, a gradual flatter or steeper positioning of the plate 13 is thereby achieved upon a further shifting toward the rear and in fact, depending on the inclination angle between the drive spindle and the plate in closing position of the plate as well as depending on a possible change of this inclination angle by actuating of the one or more height level adjustment member or, respectively, members during the opening or closing motion of the plate. The sliding element 18 of the front height-level adjustment member moves, in fact, according to a preferred embodiment of a drive spindle as an actuating member or use can be made of a similarly acting guide element on the path toward the rear exactly parallel to the actuating member. This means, according to the embodiment of FIGS. 2a to 2e, that a gradual motion of the front support 16 upwardly upon increasing shifting of the plate rearwardly, whereby the height-level adjustment thus achieved can be determined by the slope angle of the inclined plane 23. The rear plate edge is inclined increasingly downward during the opening motion since the support member 17 maintains at the rear support 36 its height-level position upon a longitudinal shift of the plate and since the plate is sloped less toward the rear then the drive spindle, the rear plate edge becomes inclined increasingly downwardly upon an opening motion. Thus, in this case, a flatter position of the plate 13 is achieved in a simple way upon increasing a shift displacement position, even though the plate 13 can be positioned sufficiently inclined in a frontmost shift position, which would correspond to a desirable and good passenger space ventilation. The Spoiler effect upon shifting of the plate 13 toward the rear is thereby decreased. This can be advantageous since the front and the rear support, in the case of a plate 13 moved toward the rear, exhibit a shorter distance and are able to accept only smaller lever forces engaging the plate 13.

If, vice versa, the plate is more inclined with respect to the motor vehicle roof than the drive spindle or, respectively, the plate and the drive spindle run apart in rearward direction, then the plate becomes positioned at an increasing inclination angle upon a shifting toward the rear. The possible motions of the individual components can be recognized from FIG. 4.

A particular advantageous embodiment is shown in FIGS. 4 to 9. The FIGS. 4 to 7 are shown on a scale of about 1 : 1 for purposes of clarity, however only the end regions of the side guides (cross beam 6), which are decisive for the functioning of the sliding roof are illustrated. In distinction from the previously presented embodiments, the embodiment according to FIGS. 4 to 9 refers to a vehicle sliding roof, which is already assembled and incorporated into the skin of the motor vehicle such that the side crossbeams 6 of the sliding roof frame are connected to the motor vehicle roof 2 by spot welding or a similar method and the crossbeams 6 form a surrounding channel. The support and guiding of the sliding roof is provided in this embodiment by elongated guide elements 43, which are bolted, glued, or in a similar way rigidly and permanently connected to the side crossbeam 6, and which are preferably parts molded from plastic. This guide element 43 is illustrated individually in FIG. 7 and, in particular, in a vertical section in longitudinal direction (A) in its middle plane (compare section lines VII—VII according to FIG. 4). This guide element is provided at its rear end with inclined rearwardly and upwardly extending and oppositely disposed grooves, which serve as the lower sliding element 20. Grooves 44 are disposed in parallel behind these grooves of this guide element 43. If necessary, the parallel running groves 44 can serve for receiving springs such as spring 27 according to FIG. 2. Inclined planes 45, disposed opposite to each other, are located in the middle region between the front and rear end of the guide element 43. The inclined planes 45 serve as a support for additional guide rails 40, which have a profile cross-section of a C-shape. The inclination of the inclined plane 45 and thus of the guide rail 40 is identical with the inclination of the drive spindle serving as an actuator member at a maximum height-level position of the rear height level adjustment member. About horizontally extending bores for recesses 46 for receiving the cross axis 15 for tilting of the drive spindle 4 and of the plate 13 are disposed at the front end of the guide elements 43 across to the longitudinal direction of the motor vehicle.

Figure 4:
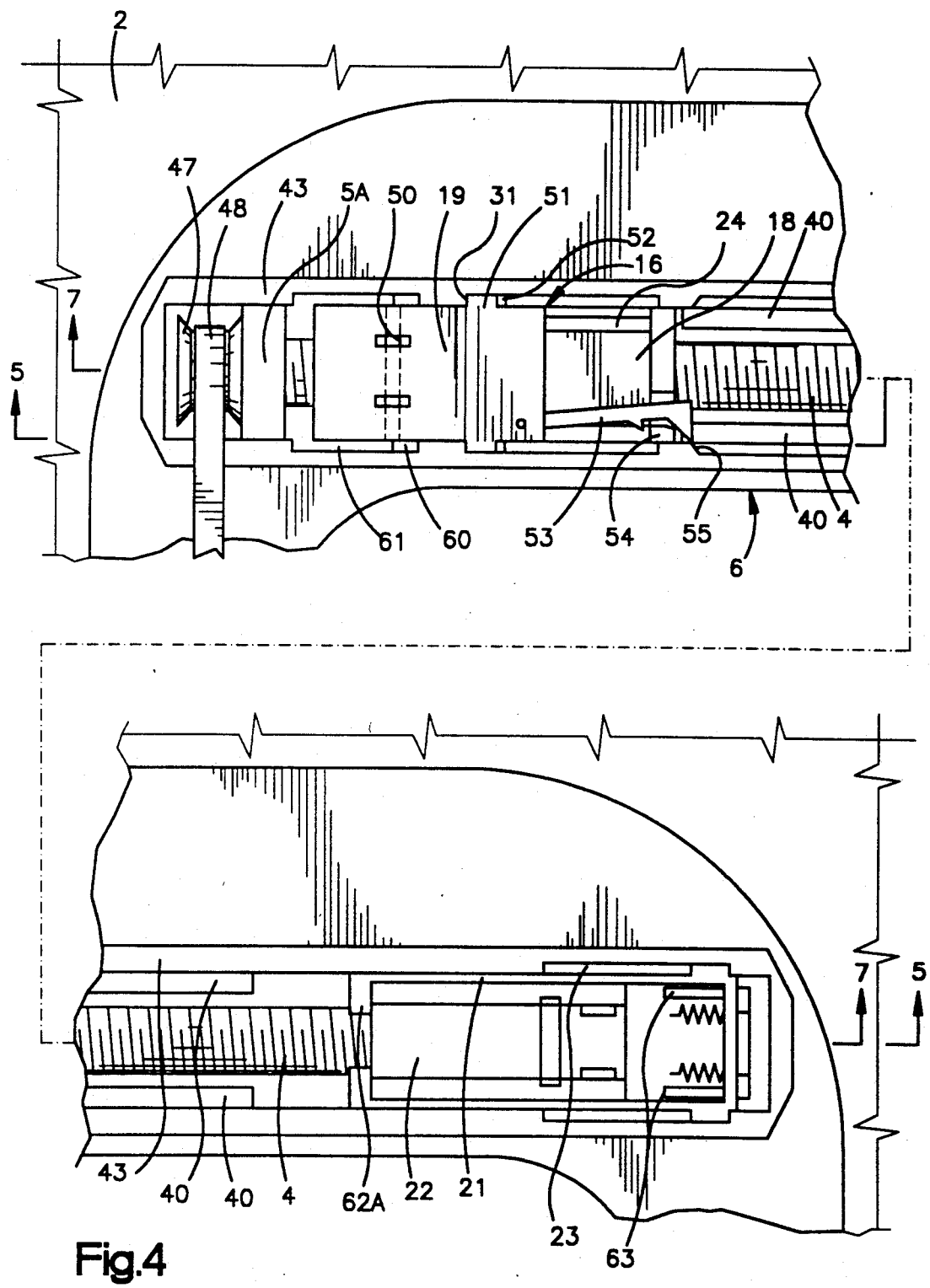
FIG. 4 is a further embodiment of a motor vehicle sliding roof in a plan view from the top, in part, with the front and rear end regions of the right frame strut in the direction of motion, of the vehicle.
Figure 5:
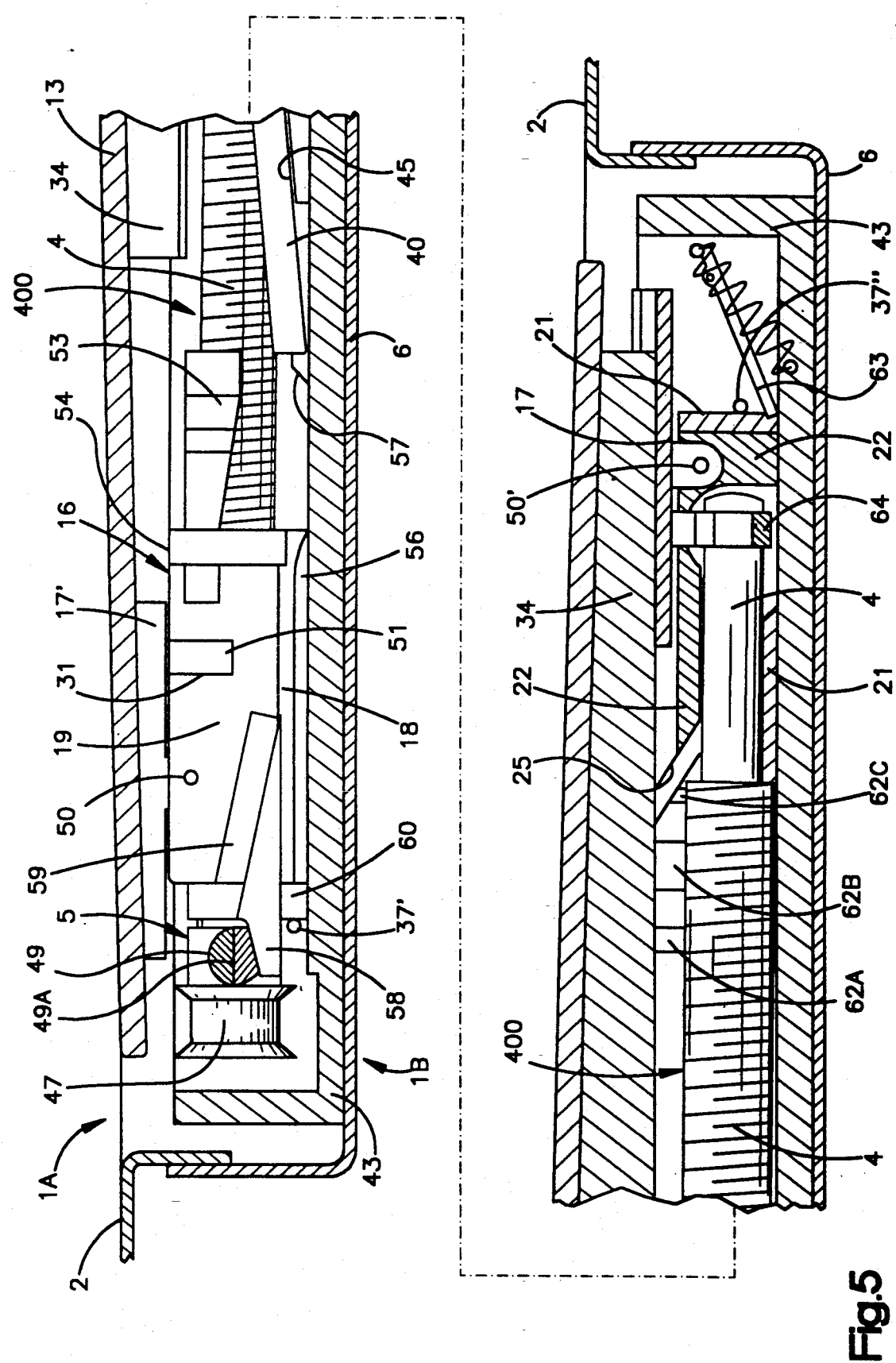
FIG. 5 is a sectional view of the motor vehicle sliding roof according to FIG. 4 along a vertical section along the section line V—V according to FIG. 4 for the situation of a completely closed cover plate.

As can be recognized from FIGS. 4, 5 and 6, the drive spindle 4 is driven by a front side drive wheel 47 with a drive belt 48 in the rotary sense. Two bearing block capsules 5A and 5B serve as front bearing blocks 5 for the drive spindles 4. The two bearing block capsules 5A and 5B form jointly sideways extending bearing journals 49 for a rotary reception in the bores 46 of the guide elements 43. The bearing journals 49 provide a cross-axis 49A.

Again, a front height level adjustment member serves as the front support 16 of the plate 13. The front height level adjustment member comprises a lower sliding element 18 driven by the drive spindle 4 and an upper sliding element 19 restrained in its motion with the sliding element 18 along an inclined plane 24.

The upper sliding element 19 carries a front support member 17' of the plate 13 with a rocking shaft 50.

In order to assure that the upper sliding element 19 of the front height-level adjustment member 16 remains at the start of the opening motion of the plate 13 in its initially assumed longitudinal position with respect to the guide element 43, the upper sliding element 19 is provided with about vertically extending side webs 51, which engage corresponding groves of the guide element 43. Thereby, the upper sliding element 19 can initially only be moved vertically until the lower end of the web 51 passes to the upper rear end of the grove 52. At the opposite direction of motion of the plate 13, the webs 51 and the groves 52 form corresponding stops 30 and 31 as they were described in connection with FIG. 2.

As soon as the upper sliding element 19 of the front height-level adjustment member 16 has concluded its maximum height level adjustment relative to the lower sliding element 18, which is shown in FIGS. 4 and 6, then the upper sliding element 19 is shifted jointly with the lower sliding element 18 in rearward direction with inner stops, not illustrated in the drawing, upon a further rotation of the drive spindle 4 in a larger opening sense. As soon as the upper sliding element 19 has left its initially assumed longitudinal position and is slid rearwardly, then a spring-loaded locking element 53 of the upper sliding element 19 engages in a corresponding locking element 54 of the lower sliding element 18. This locking engagement assures that, upon a shifting of the plate 13 forwardly, the lower sliding element 18 and the upper sliding element 19 maintain their relative position with respect to each other until the upper sliding element 19 has reached its front most position. The further motion of the lower sliding element 18 in forward direction becomes possible by providing a slide-on plane 55 on the sliding element 18 for tilting of the locking element 53.

The lower sliding element 18 exhibits side guide webs 56, which correspond to the guide rails 40 of the guide element 43. The side guide webs 56 engage in these guide rails 40 as soon as the tilting motion of the drive spindle 4 is concluded. This occurs generally then, when the front height-level adjustment member 16 has concluded its maximum height level adjustment. In order to alleviate the introduction of the guide webs 56 into the guide rail 40, a corresponding slide-on plane 57 can be provided in the guide element 43 as illustrated in FIG. 7. Furthermore, the lower sliding element 18 is provided in its front region with sideways disposed and forward protruding bolting wedges 58. These bolting wedges grip below the bearing block 5 in the region of the bearing block capsule 5B of the bearing block 5 as soon as the plate 13 has reached its closure position in a bolting sense against a lifting of the plate front edge. A groove shaped recess 59, formed between the bolting wedge 58 and the upper sliding element 19, can serve, if required, for the reception of a spring, which corresponds to the spring 26 illustrated in FIG. 2.

Upon a lowering of the plate 13 disposed in its frontmost shifting position, a pulling member described in connection with FIG. 2, which can be for example a metal rod, takes care that the rear height-level adjustment member, in the following to be described, performs the lowering motion. For this purpose, the front end 37' of the pull member 37, which incidentally is not shown for purposes of clarity, has to be slid forward by the lower sliding element 18 as soon as the upper sliding element 19 has reached its front position. For this purpose, the front end 37' of the pulling member is attached to an annular shaped support 60 which can itself be supported at the forward front end of the lower sliding element 18. The support 60 grips around the drive spindle 4 and can be guided in guide groove 61 of the guide element 43 during its forward and rearward motion. These guide grooves 61 can assume, in addition, at the front and rear ends in addition the function of a stop which prevents a further longitudinal motion.

The rear height level adjustment member is illustrated in its highest position for the situation where the plate 13 has not been shifted to the rear. In addition, the plate 13 is shown in the lower figure part of FIG. 6 in its extreme rearmost shifting position. The rear height level adjustment member comprises the recited lower sliding element 20 in the guide channel 43, a middle sliding element 21 as well as an upper sliding element 22. The three sliding elements are, as was the case with regard to FIG. 2, also restrained to move along inclined planes 23 and 25. The center sliding element 21 is shifted forward or backward in the sense of a height-level adjustment. The center sliding element 21 drives the upper sliding element 22 like a wedge upwardly based on the opposite inclination of the inclined planes 23 and 25, or alternatively pulls it down without the sliding element 22 being moved in longitudinal direction. The shifting of the center sliding element 21 in a rear direction is performed, in contrast to what is shown in FIG. 2, by employing rib 62A to 62C provided at the middle sliding element 21, which ribs engage like an inner thread into the rear threads of the drive spindle 4. As soon as the rib 62A has reached the thread end of the drive spindle 4, the drive spindle 4 can be further rotated freely without the center sliding element 21 being shifted further toward the rear. In this position of the center sliding element 21, the center sliding element 21 is maintained by a spring-loaded lever 63 in its rear most position. The motion of the center slide element 21 forwardly, that is in a lowering sense, is advantageously initiated by the already mentioned pulling member 37 of which, for purposes of clarity, only the rear end 37" is shown in FIGS. 5 and 6.

The drive spindle 4 is rotatably supported at its rear end in the upper sliding element 22 by way of bushing 64 freely rotatable, such that the drive shaft 4 can perform, relative to the upper sliding element 22, a corresponding but opposite tilting motion, relative to the tilting motion which the drive spindle 4 performs at its front end.

A short guide rail, which can be tilted around a rocking shaft 50' with respect to the upper sliding element 22 serves as a rear support member 17 of the plate 13. The guide 34, solidly connected with the plate 13, can be slidingly shifted in the tiltable guide rail. An alternate embodiment for the locking of the center sliding element 21 of the rear height-level adjustment member in its rearmost position, that is the position corresponding to the highest height-level adjustment, is illustrated in FIGS. 9a to 9c. A lever 63' is tiltably attached at the middle sliding element 21. The pulling member 37 engages with its rear end 37" the lever 63' such that, upon pulling of the pulling member 37 in a forward direction, a spring 65 becomes compressed, which spring 65 is a supported forwardly between the center sliding element 21 and the lever 63'. The center sliding element 21 is shifted rearwardly at the start of the opening motion, as was mentioned above. Thereby the middle sliding element 21 is lifted up with respect to the guide element 43. At the latest upon reaching of the rearmost end position of the center sliding element 21, the pulling member 37 becomes relaxed and the free end of the levers 63' can grip behind a spatially fixed stop 43'. In this position, the center sliding element 21 can no longer be shifted forwardly and the rear height level adjustment member is therefore arrested in its high end position. Only if the pulling member 37, upon reaching of the front shift position of the plate, becomes pull-loaded by a further driving of the drive spindle 4 in a closing sense, then the lever 63' tilts against the pressure of this spring 65 forwardly and releases the motion of the center sliding element 21 in a forward direction. The path of the lever 63' can be limited by a setscrew 63". The setscrew 63" allows in addition a synchronization of the motion of the front and rear height-level adjustment members In case of motor vehicle sliding roofs, where the force for the height level adjustment of the plate is provided in the region of the side plate edges, it can be an advantage to employ a plate which is tilted in a released state less than the skin of the motor vehicle crosswise to the motion direction of the vehicle. Such a plate is pulled downward during the final vertical closure motion at its longitudinal sides by the height level adjustment member or height level adjustment members, while it rests in its center region with its front and rear edge already on a seal or the like. Such an elastic bending process requires of course a relatively strong and extensive height level adjustment possibility at the side edges of the plate, that is also in the region of its front support. The front height level adjustment members are to be recommended without question for retrofittable Spoiler roofs in order to achieve the required sealing properties with closed plates. However, even then, when a submerging away of the plate in the middle region of the front edge upon lifting of the rear edge of the plate is undesirable, for example, if a wind deflector has to be mounted at the front edge of the motor vehicle sliding roof, then it is recommended to provide in addition to the rear height-level adjustment members also front height level adjustment members. The height level adjustment of the front height-level adjustment members, preferred according to the invention, is in general maintained relatively small and amounts for example to about 4 mm. Therefore, it can be desirable to provide the plate in the middle region of its front edge also as height level adjustable. A further height-level adjustment member 41, suitable for this purpose is illustrated in FIGS. 10a to 10d in its various working positions. A main task of this further height-level adjustment member comprises lifting of the center region of the plate front edge at the start of the opening motion or, respectively, upon a lowering at the end of the closure motion of the plate. This height level adjustment member is particularly advantageous where it lifts the plate front edge in its middle region, both during the opening as well as during the closing procedure, and which maintains it lifted up during a defined shifting path of the plate and which lowers it then again subsequently. This is possible by way of a preferably employed cam disk 42, which can be rotated in the shifting direction of the plate 13.

A retrofittable motor vehicle sliding roof is illustrated in FIGS. 10a to 10d. The two part frame 3 of the retrofittable motor vehicle sliding roof clamps in between the sheet metal of the motor vehicle roof 2 at the edge of the roof opening. The conventional crank mechanism 12 disposed about in the middle of the front cross beam 7 drives, via a drive bevel wheel 66 or a corresponding drive wheel of a belt drive, the drive spindle 4 shown in FIG. 1. A gear wheel 67 is disposed below and relative to the drive bevel wheel 66 in coaxial position and driven synchronously and simultaneously with the drive bevel wheel 66. The gear wheel 67, which force transmittingly engages gear wheel 68 and the gear wheel 68, in turn forms the lower end of a worm wheel 69. The worm wheel 69 combs with a toothed ring 70, which is rotatably fixedly connected with the cam disk 42 and which drives this cam disk in a rotary sense. Advantageously, similar cam disks 42 are provided on the two sides of the toothed ring 70. The material or at least the surface of the cam disk 42, which surface contacts the bottom side of the plate 13, is preferably made of a light elastic material in order to avoid a scratching of the plate 13.

Figure 10A:
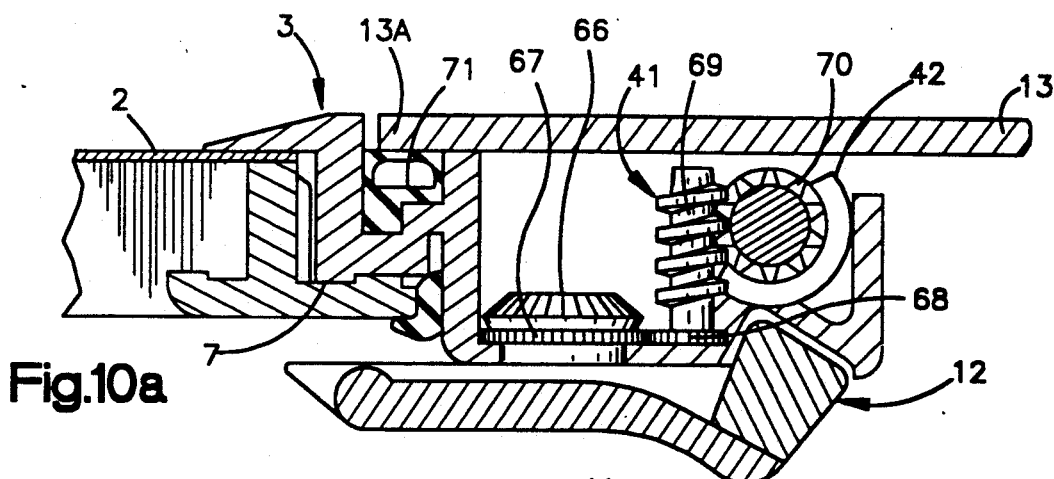
FIG. 10b is a sectional view of the motor vehicle roof according to FIG. 1 along section line X—X in a second operating position.
FIG. 10c is a sectional view of the motor vehicle roof according to FIG. 1 along section line X—X in a third operating position.
FIG. 10d is a sectional view of the motor vehicle roof according to FIG. 1 along section line X—X in a fourth operating position,.
Figure 10B:
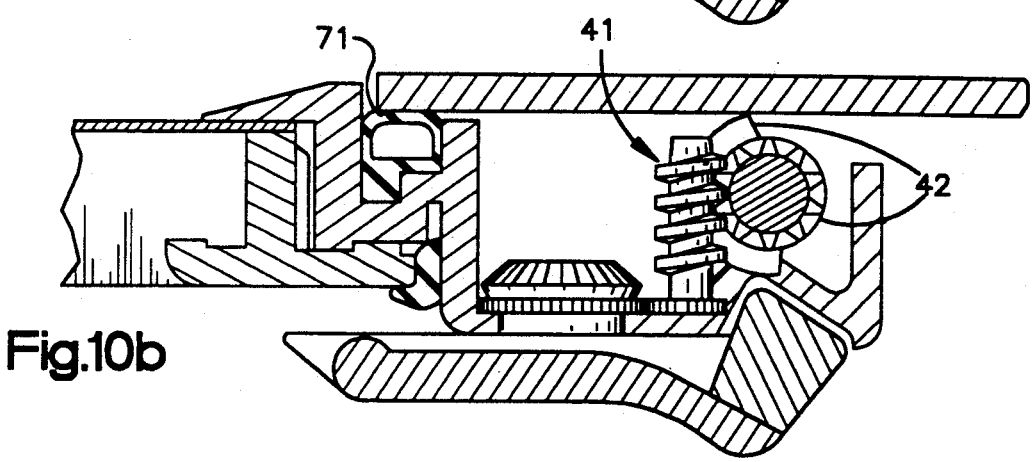
Figure 10C:
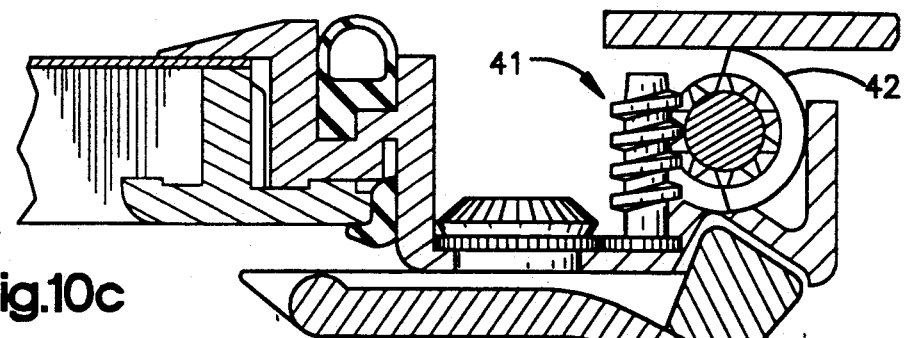
Figure 10D:
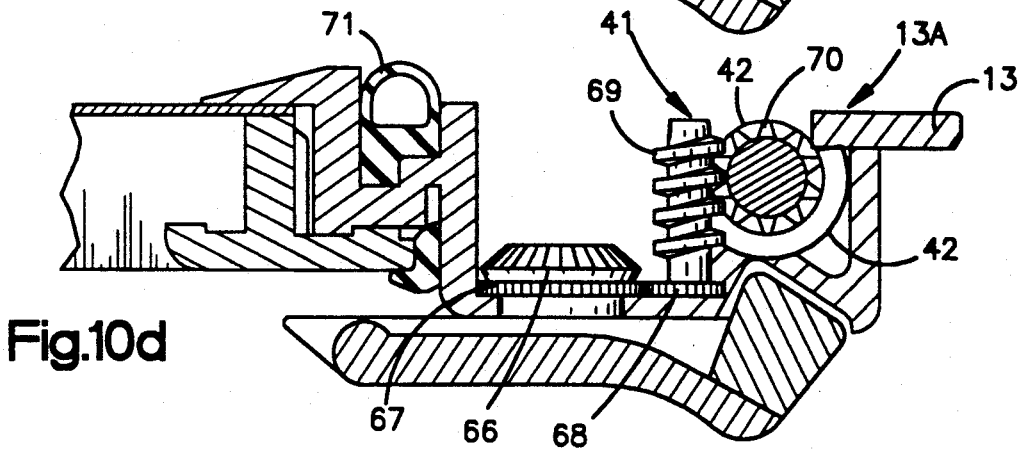
Figure 11A:
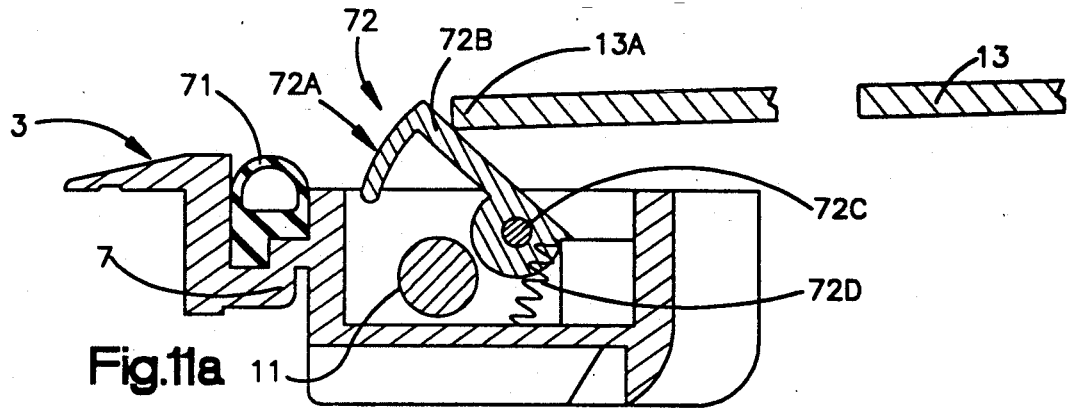
FIG. 11a is a sectional view along section line XI—XI of the motor vehicle roof according to FIG. 1 in a first operating position.
Figure 11B:
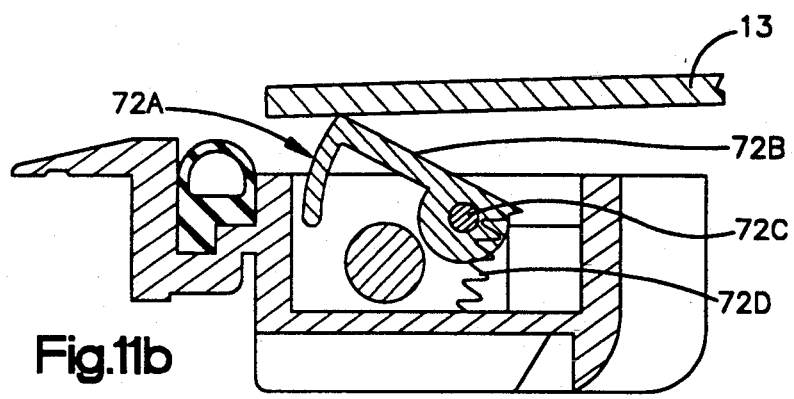
FIG. 11b is a sectional view along section line XI—XI of the motor vehicle roof according to FIG. 1 in a second operating position.
Figure 11C:
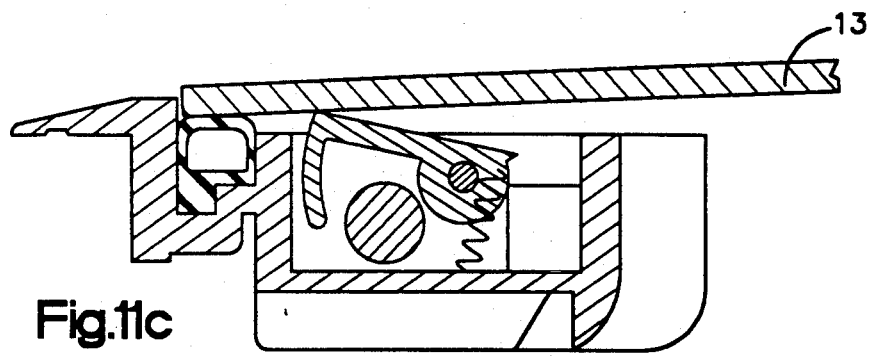
FIG. 11c is a sectional view along section line XI—XI of the motor vehicle roof according to FIG. 1 in a third operating position.
Figure 11D:
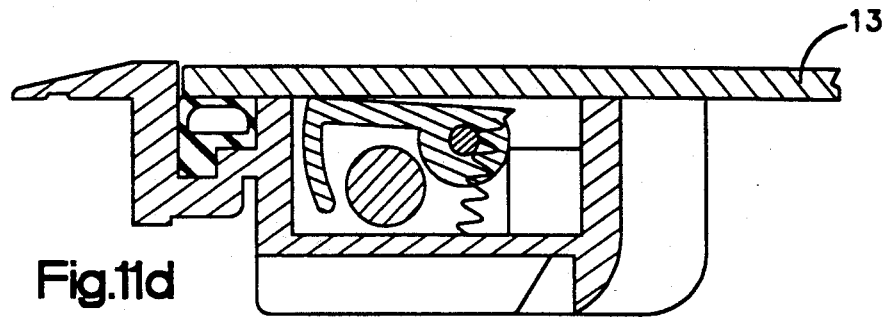
FIG. 11d is a sectional view along section line XI—XI of the motor vehicle roof according to FIG. 1 in a fourth operating position.

The cam disk 42 is disposed such that the front edge 13A of the cover plate 13 is gripped from below and, upon further rotation of the cam disk 42 and upon the simultaneously occurring synchronous shifting of the plate 14 in a forward direction, which lifts the front edge 13A of the cover plate to the desired level, as illustrated in FIGS. 10d and 10c. As soon as the frontmost position of the plate 13 is reached (compare FIG. 10b), a further rotation of the cam disk 42 results in a lowering of the front edge 13a toward a seal 71 (compare FIG. 10a) running around the frame 3. The lowering at the side edges of the plate 13 in the region of the front support 16 and the rear supports 36 is performed in the above described way simultaneously with the lowering of the front edge 13A by way of the height level adjustment member 41. It is understood that the above described further height-level adjustment member can also be employed in connection with other height-level adjustment members acting on the side of the plate 13.

As can be recognized from FIGS. 11a to 11d in connection with FIG. 1, a motor vehicle sliding roof and in particular a spoiler roof, which exhibits in the region of the front edge 13A of the plate 13 at least one height-level adjustment member, which can be in addition on the side and/or in the middle, is provided with an automatically acting wind deflector 72, if the tilting axis 72C of the automatic wind deflector 72 is disposed relatively far rearwardly in contrast to other conventional wind deflectors and if it comprises a lever 72B supported by the tilting axis 72C, and where the lever 72 is inclined opposite to the direction of the vehicle motion and is supporting at its front end the wind deflector surface 72A. Thereby, the wind deflector surface 72A is lifted overall according to a circular motion. The actuation of the wind deflector 72D can be performed solely by way of the plate 13, if a spring 72 releases or, respectively, presses down the wind reflector in the relatively relaxed position of the spring 72D in the wind deflection position illustrated in FIG. 11a and if the plate 13 relieves or, respectively, presses down the wind reflector in the region of the free end of the lever 72B at the opening and closure motion of the plate 13. This can be recognized from the sequence of motion illustrated in FIGS. 11a to 11d.

Such a wind deflector allows a problemless and reliable placing of a drive shaft 11 or of drive belt in the front cross bar 7 and, in fact, in the inner region left open by the lever 72B and the wind deflector face 72A. It is understood that such a wind deflector can be employed also independently of the specially employed drive and height level adjustment mechanism of the plate 13.

Figure 12A:
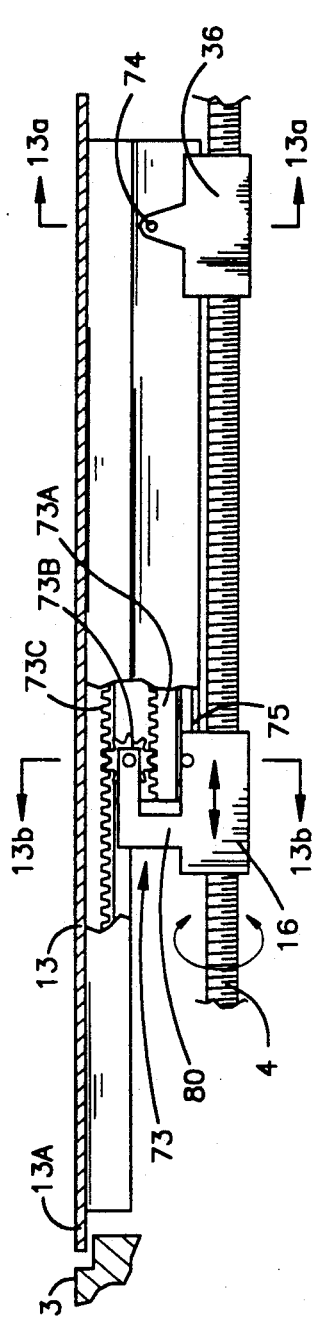
FIG. 12a is a schematic side view, in part broken up, of a sliding mechanism of a motor vehicle sliding roof according to a third embodiment in a first operating position.
Figure 12B:
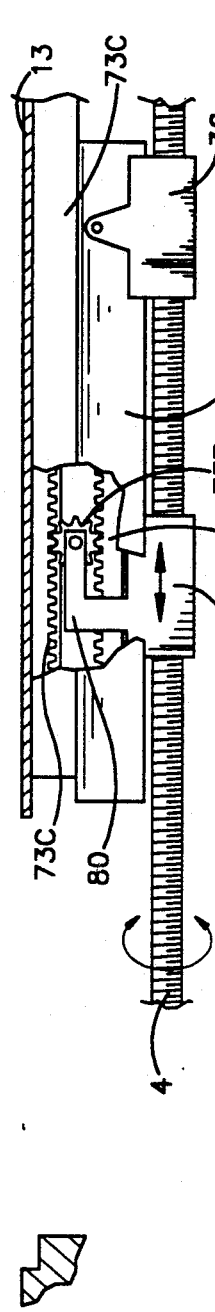
FIG. 12b is a schematic side view, in part broken up, of a sliding mechanism of a motor vehicle sliding roof according to a third embodiment in a second operating position.
Figure 12C:
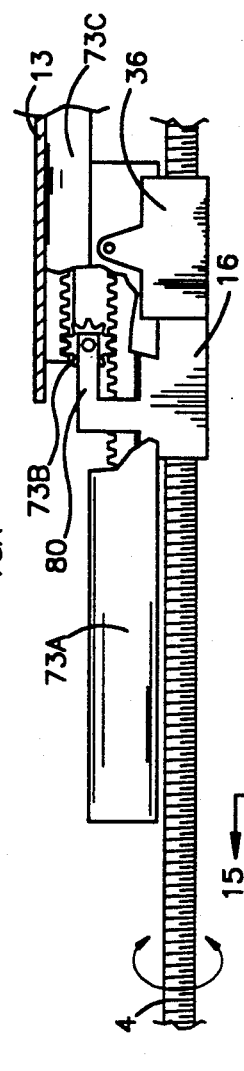
FIG. 12c is a schematic side view, in part broken up, of a sliding mechanism of a motor vehicle sliding roof according to a third embodiment in a third operating position.
Figure 14:
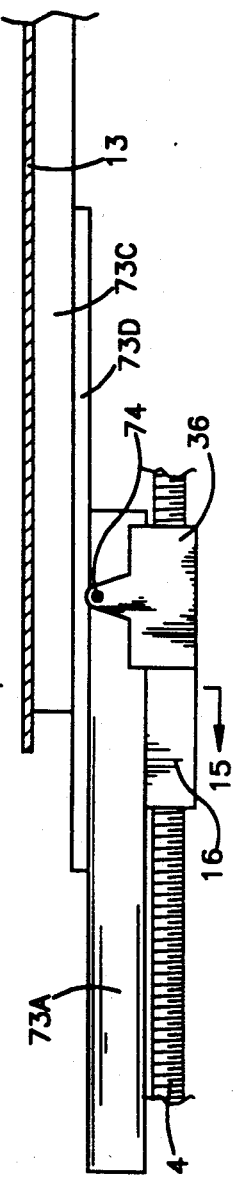
Figure 13A:
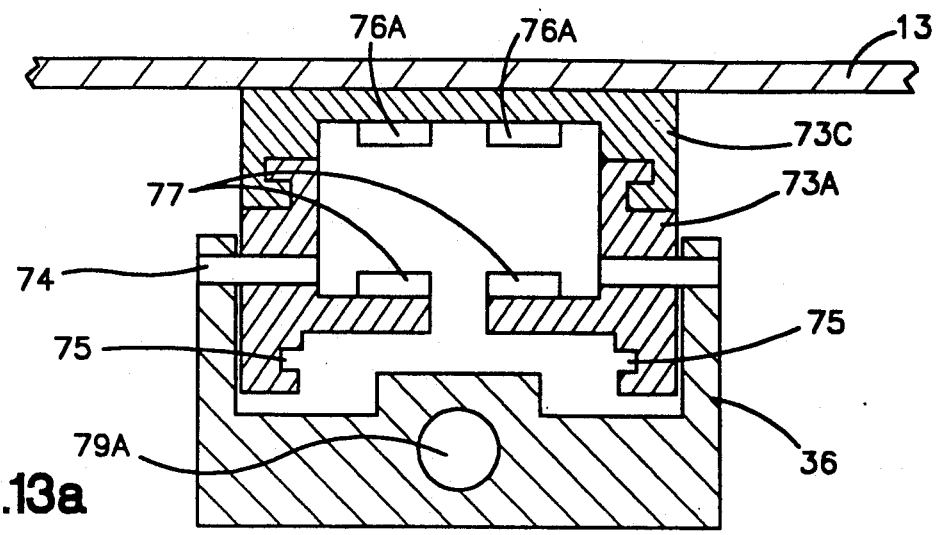
FIG. 13a is a vertical sectional view along section line XIIIa—XIIIa according to FIG. 12a of the same motor vehicle sliding roof illustrated in FIG. 12a, FIG. 13b is a vertical sectional view along the section line XIIIb—XIIIb according to FIG. 12a of the motor vehicle sliding roof according to FIG. 12a, FIG. 14 is a side view of an alternative embodiment of the motor vehicle sliding roof according to FIGS. 12a, 12b, 12c, 12a, 13b.
Figure 13B:
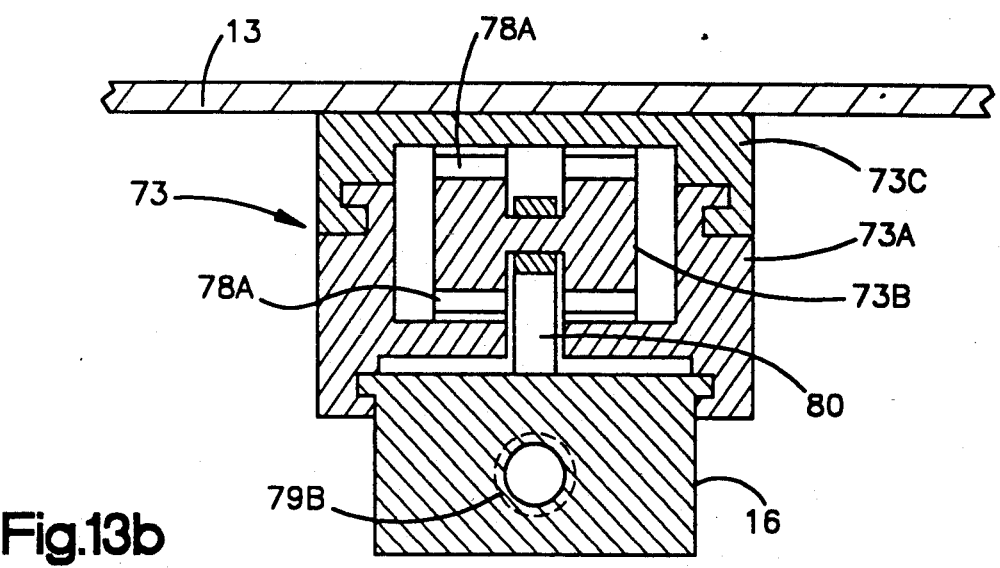

The front edge 16 of the plate 13 is generally disposed by a certain amount behind the front edge 13A. This has the consequence that the plate 13, in case of a spoiler roof arrangement, can release only in part the roof opening. In order to avoid this disadvantage, according to a further embodiment of the invention, a transmission drive 73 is provided, which is disposed, on the one hand, between the plate 13 and the front and the rear supports 16 and 36, on the other hand. This transmission drive 73 comprises a first rail 73A spatially fixable at the frame of the motor vehicle sliding roof, a second rail 73C which is fixedly connected to the plate 13 and the drive wheel 72B which can be moved forward and backward by the front support 16 in the shifting direction A (motor vehicle longitudinal direction), which drive wheel 72B is disposed with the first rail 73A and the second rail 73C such that it can roll off at both rails by force mating and shape mating. The plate side rail 73C is moved with twice the speed forward and backward as compared to the drive wheel 73C based on the rolling off of the drive wheel 73B on the frame side rail 73A, as long as the roll-off surface of the drive wheel is disposed with respect to the frame side rail 73B on the same diameter as the roll-off surface for the plate side rail 73C. This is the case according to the embodiment of FIGS. 12a and 13b. In order to increase the stability of the connection between the plate 13 and the frame 3 in case of a completely rearwardly moved plate, which position corresponds to that illustrated in FIGS. 12c and 14, there can be provided an intermediate rail 73D which slides between the frame side rails 73A and the plate side rails 73C in a fashion similar to that known of 100% pull out drawers of furniture.

Figure 15:
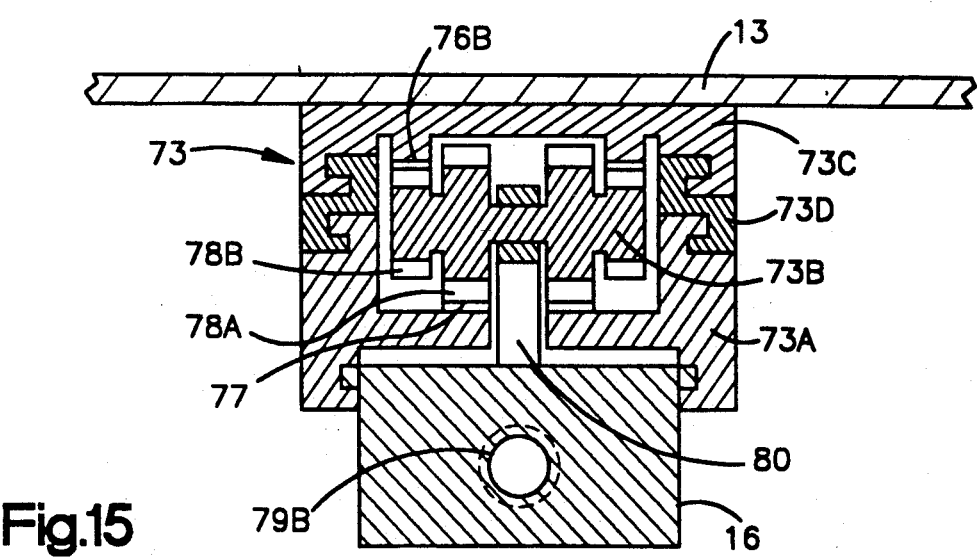
FIG. 15 is a vertical sectional view along section line according to line XV—XV according to FIG. 14 of the motor vehicle sliding roof according to FIG. 14.

If the transmission ratio becomes smaller than 2 : 1, then the front support can be disposed relatively far forwardly in case of a closed motor vehicle sliding roof without the desired effect of opening as far as possible the motor vehicle sliding roof having to be sacrificed. For this purpose, the drive wheel 73B is provided with differently sized roll-off radii where the largest roll-off radius rolls off on the frame side rail 73A, and where the smaller roll-off radius rolls off on the plate side rail 73C (compare FIG. 15).

Both the front support 16 as well as the rear support 36 can be provided with height adjustment members as they were described in connection with FIGS. 1 to 9. Furthermore, it is possible that the frame side rail 73A lies shiftably disposed with respect to the motor vehicle roof and is provided with resting means such that the transmission gear 73 becomes effective only if the frame side rail 73A reaches a spatially fixed position. The same holds with respect to the attachment between the plate 13 and the rail 73C disposed on the plate side.

The embodiments illustrated in FIGS. 12a to 15 show that the frame side rail 73A is tiltably supported with respect to the rear support 36 with a rocking shaft 74 and that the frame side rail 73A is formed in the region of its roll-off surface for the drive wheel 73B as gear rack 77 interrupted in the longitudinal center. A support arm 80 for the drive 73B, which is attached at the front support 16, extends between the two gear rack regions. The drive wheel 73B is formed as a two-disk wheel and combs, with its toothed ring 78A, adapted engagingly, positive locking, and force-transmittingly, the gear rack 77. The front support 16 can be guided in guide grooves 75 of the frame side rail 73A (compare FIGS. 11a and 13b). The plate side rail 73C is shiftably disposed with conventional guide elements relative to the frame side rail 73A. The plate side rail 73C is provided with gear racks 76A with the toothed rings 78A of the drive wheel 73B as illustrated in FIGS. 13a and 13b. The plate side rail 73C is provided with two gear racks 76B in the embodiment illustrated in FIGS. 14 and 15 with a comparably smaller transmission gear ratio. The toothed rings 78B of the drive wheel 73B comb the two gear racks 76B. In this case, on the one hand, the frame side rail 73A and the intermediate rails 73D and, on the other hand, the intermediate rail 73D and the plate side rail 73C are guided slidingly shiftable with respect to each other. The front support 16 is provided with a worm thread 79B, which combs with the drive spindle 4. In contrast, the rear support 36 is provided with a bearing 79A formed as a bore hole, where the inner diameter of the bore hole corresponds closely to the outer diameter of the drive spindle 4 such that the drive spindle 4 can be freely rotated in the bore hole.

Figure 16:
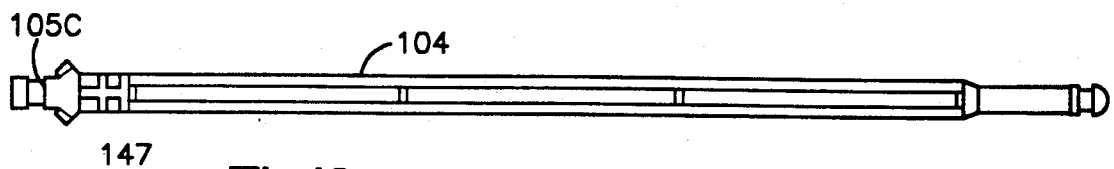
FIG. 16 is a sectional view of an alternative embodiment of a drive spindle.

FIG. 16 illustrates an alternative drive spindle 104 corresponding to the drive spindle 4 of FIG. 1a. The left side end of the drive spindle 104 is provided with a bevel gear as a drive wheel 147. The drive wheel 147 can be rotated via a corresponding driver bevel gear (not illustrated in FIG. 16). According to the embodiment of FIG. 5, a bearing support corresponding to the bearing support 5 of FIG. 5 is disposed behind the driver wheel 147, whereas in contrast a bearing support 5 is disposed according to the bevel gear drive of FIG. 16 at the point of the rotation axis, that is ahead of the drive wheel 147.

The drive spindle 104 is preferably provided with a metric ISO trapezoidal thread according to German Industrial Standard DIN 103. The slope of the thread can be from about 5 to 20 millimeters and is preferably 12 millimeters. The pitch can be from about 2 to 10 millimeters and is preferably about 3 millimeters and the number of starts can be from 2 to 10 and is preferably about 4.

Figure 17:
FIG. 17 is a sectional view of a thread of a drive spindle according to FIG. 16.

FIG. 17 illustrates a cross-section of the thread of the drive spindle 104. The pitch angle as illustrated can be from about 20 to 45 degrees and is preferably about 30 degrees. The top section of the teeth and bottom sections between the teeth can be from between 0.5 to 2 times the width of the sloped section.

Figure 18:
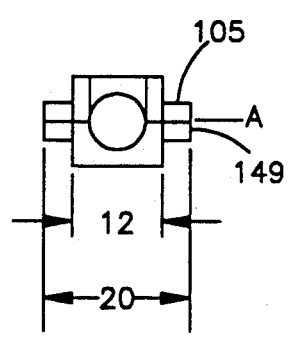
FIG. 18 is a sectional view of the bearing of the drive spindle according to FIG. 16.
Figure 19:
FIG. 19 is a sectional view of the bearing according to FIG. 18 along section line AA.

FIG. 18 illustrates a detail of FIG. 16 and in particular the support 105. According to FIG. 20 the bearing support 105 includes two half bearing support shells that is an upper half bearing support shell 105A and and a lower half bearing support shell 105B. These two half bearing support shells grip then into the groove 105C of the drive spindle 104 as shown in FIG. 16. A bearing pin 149 extends on the side of the half bearing support shells 105A and 105B. The bearing pins 149 are rotatably supported in the frame brace 6 (compare FIG. 1) such that the drive spindle 104 can swivel around this bearing support. FIG. 19 is a side view of the embodiment of FIG. 18.

Figure 20:
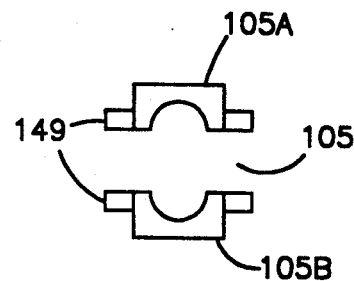
FIG. 20 is an exploded view of the embodiment according to FIG. 18.
Figure 21:
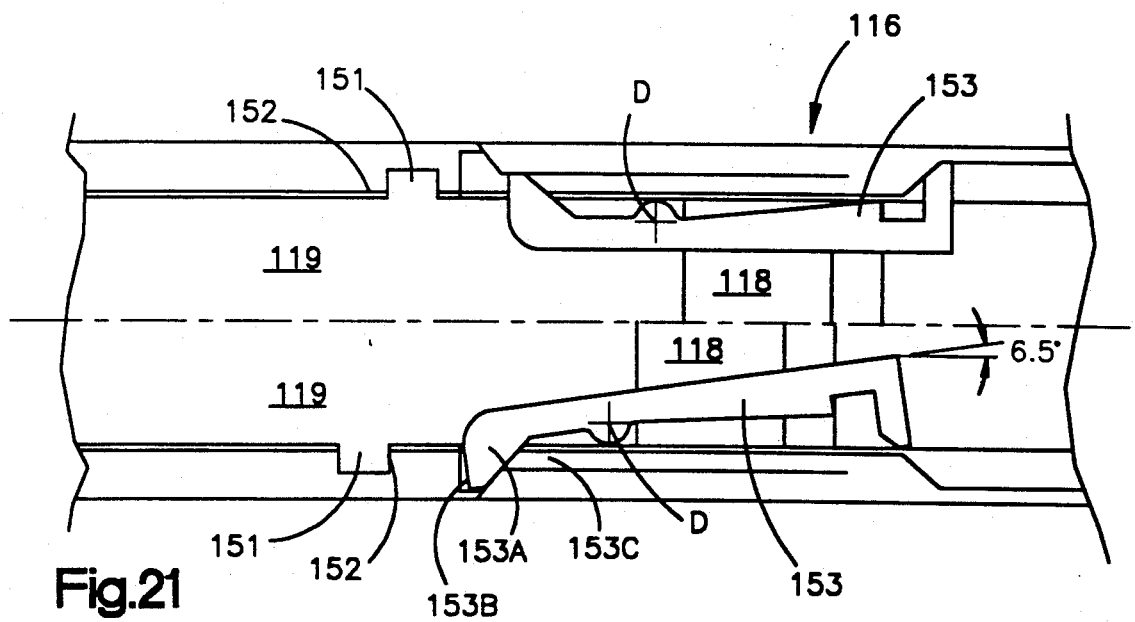
FIG. 21 is a sectional view of an improved embodiment of a front support.
Figure 22:
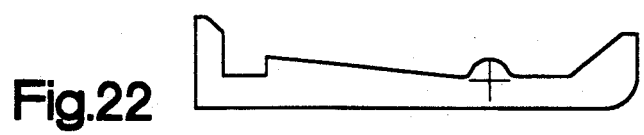
FIG. 22 is a sectional view of a locking element employed according to FIG. 20.

FIG. 20 illustrates an improved embodiment relative to the front support 16 illustrated in FIG. 4, upper part in two different operating positions. The upper sliding element 119 remains essentially unchanged versus the embodiment of FIG. 4, only the webs 151 are positioned further toward the front. A further improvement comprises an extension of the spring-loaded locking element 53 of FIG. 4, where a locking element 153 is provided according to FIG. 21 as a two arm lever which lever can be swivelled around its axis point D. FIG. 21 illustrates two frontmost sliding positions. The lowermost sliding element 118 is rigidly connected at least in one operating direction to the upper sliding element 119 via the locking element 153.

If a force should be of sufficient size to overcome the oppositely acting spring force between the two sliding elements 118 and 119, then a force such as for example a wind force acting on the cover plate could slide the upper sliding element 119 versus the lower sliding element 118 toward the rear for the state represented in the lower half of FIG. 21 and in FIG. 4, where the locking element 153 is disengaging or just has disengaged. In order to come to grips with this in principle improbable situation, the second lever arm extended beyond it rotation axis point D engages with its nose 153A into a recess 153B disposed spacially fixed at the frame. If the lower sliding element 118 is shifted further in front direction by further rotation of the drive spindle 104, then the upper sliding element 119 can move downwardly via the vertical guiding between its two webs 151 and the grooves 152 disposed spacially fixed relative to the frame Preferably two locking elements 153 are disposed opposite to each other in order to achieve a force transmission free from clamping.

The embodiment according to FIG. 21 is associated with the further advantage that the locking element 153 does not have to be spring-loaded in order to maintain its location in the different sliding positions, since the nose 153A together with a corresponding guide groove 153C can maintain constant the tilting position of the locking element 153 in the frame.

Figure 23:
FIG. 23 is a side view of the drive spindle according to FIG. 16 in a first position.
Figure 24:
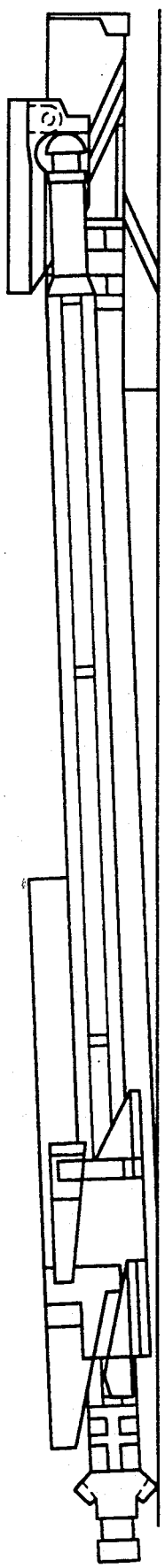
FIG. 24 is a side view of the drive spindle according to FIG. 16 in a second shifted position.
Figure 25:
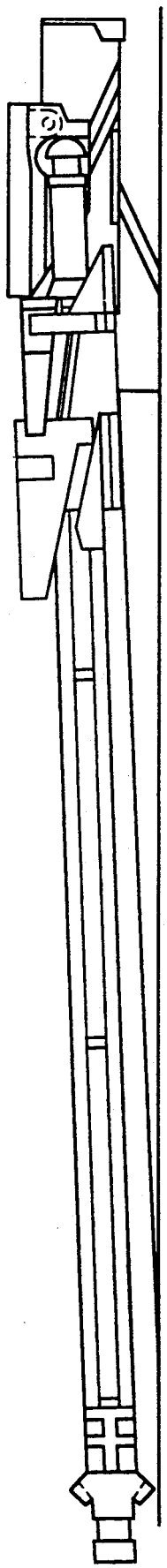
FIG. 25 is a side view of the drive spindle according to FIG. 16 in a third shifted position.

FIGS. 23 to 25 illustrate a drive spindle according to FIG. 16 in three different operational positions, that is in a complete closure position (FIG. 23), in an initial lift position (FIG. 24) and finally in a fully shifted position of the cover plate.

The rear height level adjustment member remains preferably at its maximum height level position while in all rearwardly shifted positions of the plate 13. Correspondingly, the lower, middle and upper sliding elements 20, 21, and 22 have to be maintained in a position of maximum height level shift with respect to each other. This is accomplished with a lever 63 according to FIG. 6, lower half as well as according to FIGS. 9a and 9c.

Figure 26:
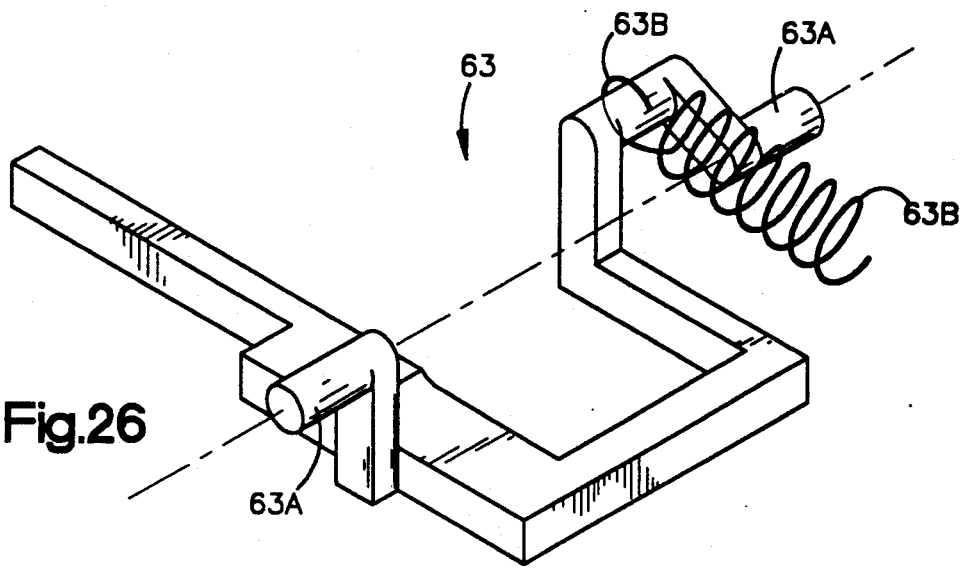
FIG. 26 is a perspective view of a lever of FIG. 9 in detail.
Figure 27:
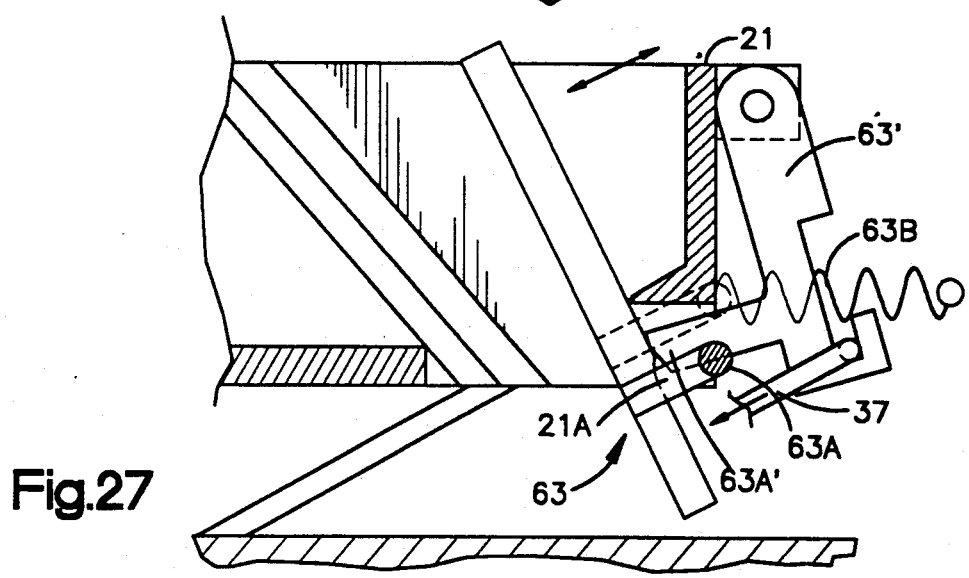
FIG. 27 is a view of an illustration of an operational mechanism of the lever according to FIG. 26.
Figure 28:
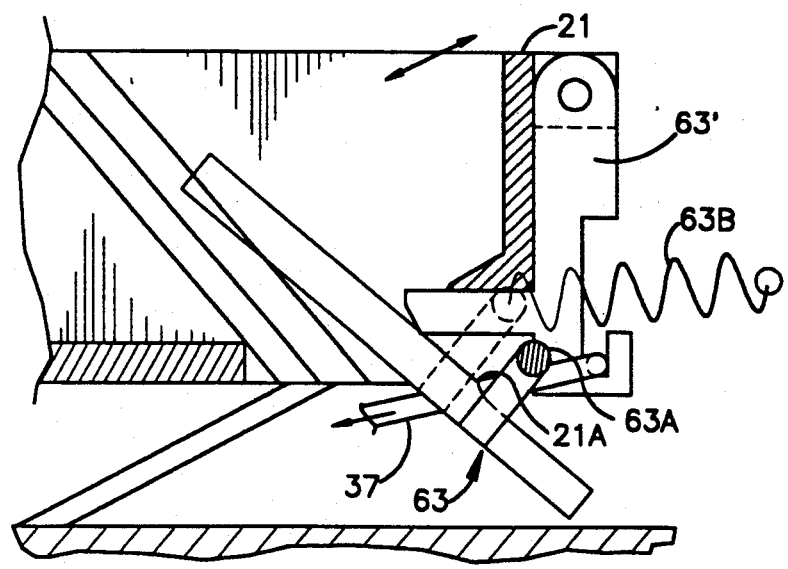
FIG. 28 is a second view of an illustration of an operational mechanism of the lever according to FIG. 26 in a position different from that of FIG. 27.

In order to achieve a maximum locking safety, this lever 63 can be formed into the shape illustrated in FIG. 26. The mode of operation of the lever 63 is as follows: The lever 63 is rotatably supported via bearing pins 63A in corresponding recesses of the frame braces 6, 7. The lever 63 is pulled into an upright position by a spring 63B. A second lever 63' engages with a cam 63'A at a lever 63 above the point 63A of the rotation axis. The lever 63' is similarly rotatable attached at the middle sliding element 21 as is illustrated in FIG. 9 a/c. The pulling member 37 engages the lever 63'. If the largest height level of the rear height level adjustment member is obtained, then the pulling member 37 is fully released and the lever 63' is swivelled in a rear position under indirect action by the spring 63B. The lever 63 can thereby be disposed at such a steep slope that the face 21A (FIG. 27) of the sliding element 13, which sliding element 13 can then act on the lever 63, cannot generate a torque on the lever 63. The lever 63 is swivelled so far via the cam 63'A only by a forward pull of the lever 63' that the previously mentioned face 21A (FIGS. 27, 28) of the sliding element 21 now exerts a torque on the lever 63 and can press the lever 63 further forward (compare FIG. 28).

According to the first embodiment of the invention, it is a basic principle of the invention to employ the tiltability of the guide rail, which achieves in particular very advantageous course of motion of the plate 13. According to a second embodiment of the invention, it is a principle of the invention that the rear height level adjustment member is comprised of three sliding elements. These three sliding elements allow, for example, that even in case of a flat and small height construction, a relatively large height-level adjustment is assured while simultaneously precise guide properties are provided According to a third embodiment of the invention, the invention provides the principle that one height level adjustment member, comprising at least two height-level adjustable elements based on relative motion with respect to each other, guides longitudinally sliding at the plate and that the height level adjustment member is fixedly disposed with respect to the motor vehicle roof. At least one of the two sliding elements of the height-level adjustment member can be adjusted independent of the sliding motion of the plate in a height level adjustment sense and can be adjusted in its relative position with respect to the other sliding element of the height-level adjustment member. This achieves, among other things, a decoupling of the height-level adjustment from the sliding of the plate, while simultaneously providing precise guide properties.

It will be understood that each of the elements described above, or two or more together, may also find a useful application in other types of vehicular roof system configurations and ventilating procedures differing from the types described above.

While the invention has been illustrated and described as embodied in the context of a sliding roof for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A vehicle sliding roof comprising:
   a vehicle roof (2) having an opening (1);
   a plate (13) having a front edge (13A) and a rear edge (13B) and adapted to close in its frontmost position the opening (1) in the vehicle rood (2) and which plate (13) is adapted to be slid outside of the roof opening (1) into several positions on one side of the vehicle roof (2);
   a front support (16) supporting the plate (13) near its front edge (13A);
   a guide rail (40, 400) for guiding the plate (13) along the guide rail (40, 400) along a forward and backward motion relative to the longitudinal direction (A) of the vehicle;
   a rear support (36) supporting the plate (13);
   a height level adjustment member (200) associated with the rear support (36) and disposed at a location near the rear edge (13B) of the plate (13) and slidingly guided relative to the vehicle roof (2) in a longitudinal direction (A) of the vehicle for inducing height-level adjustment of the height level of the plate (13) versus the vehicle roof (2), and formed as a sliding member (21), a lower element, and an upper sliding element (22);
   the guide rail (40, 400) comprising an actuating member (4) for applying a translatory force to the plate (13) for sliding the plate (13) relative to the guide rail (40, 400) in the longitudinal direction (A) of the motor vehicle; and
   means for driving the sliding member (21) forward and backward while the plate (13) remains substantially at rest relative to said longitudinal direction (A) of the vehicle.

2. A vehicle sliding roof for a vehicle having a longitudinal direction (A), the vehicle sliding roof comprising:
   a vehicle roof (2) having an opening (1), an upper side (1A), and a lower side (1B),
   a plate (13) having a front edge (13A) and a rear edge (13B), the plate (13) closing the opening (1) in the vehicle roof (2) when the plate (13) is in a frontmost position, the plate (13) being slidable relative to the opening (1) in the vehicle (2) into a plurality of positions on one side of the vehicle roof (2);
   a front support (16) supporting the plate (13) near the front edge (13A) of the plate (13);
   a guide rail (400) for guiding the plate (13) in a forward and backward motion along the longitudinal direction (A) of the vehicle;
   a rear support (36) for supporting the plate (13), the rear support (36) including a rear height level adjustment mechanism (200) for adjusting the height level of the plate (13) relative to the vehicle roof (2) when the plate (13) is in its frontmost position and the rear height level adjustment mechanism (200) engages the plate (13) at a location adjacent the rear edge (13B) of the plate(13), the rear height level adjustment mechanism (200) including at least two elements (20, 21; 21, 22) slidable relative to each other along an inclined plane (23; 25);
   the guide rail (400) comprising an actuating member (4) for applying a translatory force to the plate (13) for sliding the plate (13) relative to the rear height level adjustment mechanism (200) and to the opening (1) along the longitudinal direction (A) of the vehicle, the actuating member (4) inducing height-level adjustment of the plate (13); and
   means associated with at least one of the elements (20, 21; 21, 22) for driving the at least one element forward and backward while the plate (13) remains substantially at rest along the longitudinal direction (A) of the vehicle.

3. The vehicle sliding roof according to claim 2 further comprising a cross axle (15) for the guide rail (400) and a bearing journal (5) for tilting the guide rail (400) with the rear height level adjustment member (200) around the cross axle (15).

4. The vehicle sliding roof according to claim 2 wherein the at least two elements (20, 21; 21, 22) of the rear height-level adjustment member (200) are guided along joint inclined planes (23, 25), each plane being associated jointly with a pair of elements (20, 21; 21, 22) for providing an increased total height-level adjustment range.

5. The vehicle sliding roof according to claim 2 wherein a first one (20) of the two elements (20, 21) is fixed relative to the roof (2) of the vehicle and a second one (21) of the two elements (20, 21) is disposed above the first one (20) of the two elements (20, 21), an inclined plane (23) being formed between the two elements (20, 21) and rising toward the rear side of the vehicle, the plate (13) being slidable above the roof (2) of the vehicle.

6. The vehicle sliding roof according to claim 2 wherein the guide rail (400) is provided by a drive spindle forming the actuating member (4) of the plate (13).

7. The vehicle sliding roof according to claim 6, wherein the drive spindle has two ends, one end, which is not directly engaged with a driving force, being freely rotatably supported in an upper one (22) of the elements (20, 21, 22).

8. The vehicle sliding roof according to claim 2 further comprising a spring (27) disposed between the two elements (21, 20) and acting in the longitudinal direction (A) of the vehicle in the sense of providing a mutual shifting of the elements.

9. The vehicle sliding roof according to claim 8 further comprising (i) a first detent stop (28) disposed at a first one (21) of the elements and (ii) a second detent stop (29) disposed at a second one (20) of the elements and corresponding to the first detent stop where the two elements (20, 21) form part of the rear height level adjustment mechanism (200).

10. The vehicle sliding roof according to claim 8 further comprising a detent stop (28, 29) disposed at one (21) of the elements of the rear height level adjustment member (200) for allowing tensioning of the spring (27), the detent stop (28, 29) being effective during a forward and backward shifting of the driven element (21).

11. The vehicle sliding roof according to claim 2 further comprising an axle (50) extending perpendicular relative to the longitudinal direction (A) of the vehicle, the elements of the rear height level adjustment mechanism (200) being tiltable relative to the plate (13).

12. The vehicle sliding roof according to claim 2 further comprising a front height level adjustment mechanism (300) including two elements (18, 19) slidable relative to each other along an inclined plane (24).

13. The vehicle sliding roof according to claim 12 wherein one element (19) of the front height level adjustment mechanism (300) is shiftable forward and backward in its height-level position reached during opening of the plate (13).

14. The vehicle sliding roof according to claim 13 wherein the other element (18) of the front height level adjustment mechanism (300) can be driven to shift forward and to shift backward.

15. The vehicle sliding roof according to claim 14 wherein the other element (18) initially is slidable to enable adjustment of the height level of the plate (13) during the initial phase of the opening motion of the plate (13), the other element (18) being further shiftable to the rear to enable shifting of the plate (13) horizontally only after the plate (13) reaches a desired height level.

16. The vehicle sliding roof according to claim 14 wherein the other element (18) is shiftable to enable shifting of the plate (13) forward in the longitudinal direction (A) of the vehicle during a closing motion of the plate (13), the plate (13) being adjusted in its height level into its closed position lying in the plane of the vehicle roof after the plate (13) has shifted forward in the longitudinal direction (A) of the vehicle.

17. The vehicle sliding roof according to claim 2 wherein the front support (16) includes a front height level adjustment mechanism (300), the vehicle sliding roof further comprising (i) a pulling member (37) engaging one element (21) of the rear height level adjustment mechanism (200) and acting in at least one shifting direction to enable shifting of the element (21), (ii) a detent stop (38) attached to the pulling member (37) and (iii) a detent stop (39) attached to an element (18) of the front height-level adjustment mechanism (300).

18. The vehicle sliding roof according to claim 2 further comprising an end-side angle drive including bevel wheels (8, 9), and a drive shaft (11) for driving the bevel wheels (8, 9) to actuate the actuating member (4).

19. The vehicle sliding roof according to claim 2 wherein the actuating member (4) and the rear height level adjustment mechanism (200) include components made of plastic.

20. The vehicle sliding roof according to claim 12 further comprising a spring (26) disposed between the two elements (18, 19) of the front height level adjustment mechanism (300) and acting in the longitudinal direction (A) of the vehicle to provide a mutual shifting of the sliding elements.

21. The vehicle sliding roof according to claim 20 further comprising (i) a first detent (28') disposed at a first one (18) of the elements of the front height level adjustment mechanism (300) and a second detent stop (28') disposed at a second one (19) of the elements of the front height level adjustment mechanism (300) and corresponding to the first detent stop (28').

22. The vehicle sliding roof according to claim 20 further comprising a detent stop (31) disposed at one of the elements (19) of the front height level adjustment member (300) for allowing tensioning of the spring (23), the detent stop (31) being effective during a forward and backward shifting of the driven element (18).

23. The vehicle sliding roof according to claim 12 further comprising an axle (50') extending perpendicular to the longitudinal direction (A) of the vehicle, the elements of the front height level adjustment mechanism (300) being tiltable relative to the plate (13).

24. The vehicle sliding roof according to claim 12 wherein the actuating member (4) and the front height level adjustment mechanism (300) include components made of plastic.

25. The vehicle sliding roof for a vehicle having a longitudinal direction (A), the vehicle sliding roof comprising:
a vehicle roof (2) including a frame (2) defining an opening (1);
a plate (13) having a front edge (13A) and a rear edge (13B), the plate (13) closing the opening (1) in the vehicle roof (2) when the plate (13) is in a frontmost position, the plate (13) being displaceable outside the roof opening (1) into different positions on one side of the vehicle roof (2);
a front support (16) supporting the plate (13) near the front edge (13A) of the plate (13);
a guide rail (400) for guiding the plate (13) in the vicinity of its front edge (13A) in a forward and backward motion along the guide rail (400) in the longitudinal direction (A) of the vehicle;
the guide rail (400) comprising an actuating member (4) for displacing the plate (13) and adjusting the height of the plate (13);
a rear support (36) for supporting the plate (13), the rear support (36) including a rear height adjustment mechanism (200) for adjusting the height level of the plate (13) in the vicinity of its rear edge (13B); and
the guide rail (400) being tiltable by means of the rear height adjustment mechanism (200) about a horizontal transverse axis (15), the plate (13) being guided so as to slide relative to the rear height adjustment mechanism (200) in the longitudinal direction (A) of the vehicle.

* * * * *

UNITED STATES PATENT AND TRADEMARK OFFICE
CERTIFICATE OF CORRECTION

PATENT NO. : 5,238,290
DATED : August 24, 1993
INVENTOR(S) : Rolf Farmont

It is certified that error appears in the above-indentified patent and that said Letters Patent is hereby corrected as shown below:

Column 27, line 42, change "rood" to --roof--.

Column 27, line 60, after "element" insert --(20)--.

Column 30, line 35, change "The" to read-- A--.

Signed and Sealed this

Twenty-sixth Day of April, 1994

Attest:

BRUCE LEHMAN

*Attesting Officer*  *Commissioner of Patents and Trademarks*